United States Patent
Bang et al.

(10) Patent No.: US 12,382,437 B2
(45) Date of Patent: Aug. 5, 2025

(54) METHOD AND APPARATUS FOR TRANSMITTING AND RECEIVING DOWNLINK CONTROL INFORMATION IN WIRELESS COMMUNICATION SYSTEM

(71) Applicant: Samsung Electronics Co., Ltd., Suwon-si (KR)

(72) Inventors: Jonghyun Bang, Suwon-si (KR); Sungjin Park, Suwon-si (KR); Jinyoung Oh, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/296,456

(22) Filed: Apr. 6, 2023

(65) Prior Publication Data

US 2023/0247593 A1    Aug. 3, 2023

Related U.S. Application Data

(63) Continuation of application No. 17/152,141, filed on Jan. 19, 2021, now Pat. No. 11,653,336.

(30) Foreign Application Priority Data

Jan. 16, 2020  (KR) .......................... 10-2020-0006167

(51) Int. Cl.
*H04W 72/044*   (2023.01)
*H04W 72/0453*  (2023.01)
*H04W 72/1268*  (2023.01)

(52) U.S. Cl.
CPC ..... *H04W 72/044* (2013.01); *H04W 72/0453* (2013.01); *H04W 72/1268* (2013.01)

(58) Field of Classification Search
CPC ... H04L 5/0098; H04L 5/0053; H04L 5/0007; H04L 76/30; H04W 72/23;
(Continued)

(56) References Cited

U.S. PATENT DOCUMENTS

| 11,546,929 B2 | 1/2023 | Cao et al. |
| 2018/0175986 A1 | 6/2018 | Chendamarai Kannan et al. |

(Continued)

FOREIGN PATENT DOCUMENTS

| CN | 110431910 A | 11/2019 |
| EP | 3 478 019 A1 | 5/2019 |

(Continued)

OTHER PUBLICATIONS

Qualcomm Incorporated, 'Resource allocation for autonomous UL access', R1-1713026, 3GPP TSG RAN WG1 #90, Prague, Czech, Aug. 12, 2017.

(Continued)

*Primary Examiner* — Mang Hang Yeung
(74) *Attorney, Agent, or Firm* — Jefferson IP Law, LLP

(57) ABSTRACT

A method and an apparatus for transmitting and receiving downlink control information in a wireless communication system are provided. The method of the terminal includes receiving uplink configuration information from a base station, receiving, from the base station, downlink control information (DCI) including information related to activation of grant-free uplink transmission, identifying the information related to the activation of the grant-free uplink transmission, based on the uplink configuration information, and transmitting an uplink signal to the base station, based on a result of the identifying.

12 Claims, 13 Drawing Sheets

(58) Field of Classification Search
CPC ........... H04W 72/1286; H04W 72/044; H04W 72/053; H04W 72/0453; H04W 72/1268
See application file for complete search history.

(56) References Cited

U.S. PATENT DOCUMENTS

| | | | |
|---|---|---|---|
| 2019/0053319 | A1 | 2/2019 | Jeon et al. |
| 2019/0104517 | A1 | 4/2019 | Park |
| 2019/0230689 | A1 | 7/2019 | Cao et al. |
| 2020/0059905 | A1 | 2/2020 | Tang |
| 2020/0313809 | A1 | 10/2020 | Park et al. |
| 2020/0366454 | A1* | 11/2020 | Shen ................... H04L 5/001 |
| 2021/0029681 | A1* | 1/2021 | Tang ............. H04L 27/26025 |
| 2021/0051759 | A1* | 2/2021 | Zhou .................. H04W 76/28 |
| 2021/0143970 | A1* | 5/2021 | Xu ..................... H04L 5/0098 |
| 2021/0144686 | A1* | 5/2021 | Fakoorian ............ H04L 5/0053 |
| 2022/0086761 | A1* | 3/2022 | Maleki ............. H04W 52/0216 |
| 2023/0231672 | A1* | 7/2023 | Chen ................... H04W 72/23 370/329 |

FOREIGN PATENT DOCUMENTS

| | | |
|---|---|---|
| KR | 10-2019-0073458 A | 6/2019 |
| KR | 10-2020-0116392 A | 10/2020 |
| WO | 2011/109290 A1 | 9/2011 |
| WO | 2018/184543 A1 | 10/2018 |

OTHER PUBLICATIONS

Nokia et al., 'Resource allocation for Autonomous UL Access', R1-1712942, 3GPP TSG-RAN WG1Meeting #90, Prague, Czech Republic, Aug. 11, 2017.
International Search Report dated Apr. 27, 2021, issued in International Application No. Application No. PCT/KR2021/000381.
Qualcomm Incorporated, "Enhanced Grant-Fee Transmissions for eURLLC," R1-1912964, Nov. 9, 2019.
Vivo, "Discussion on physical UL channel design in unlicensed spectrum," R1-1912011, Nov. 8, 2019.
MediaTek Inc., "NR Sidelink Mode-1 resource allocation," R1-1912105, Nov. 9, 2019.
Extended European Search Report dated Nov. 29, 2022 issued in European Application No. 21741969.6.
Chinese Office Action dated May 6, 2024, issued in Chinese Application No. 202180009515.6.
Nokia et al.; Remaining NR-U enhancements for uplink signals and channels; 3GPP TSG RAN WG1 #98bis; R1-1910594; Chongqing, P.R. China; Oct. 14-20, 2019.
Korean Office Action with English translation dated Mar. 17, 2025; Korean Appln. No. 10-2020-0006167.

* cited by examiner

METHOD AND APPARATUS FOR TRANSMITTING AND RECEIVING DOWNLINK CONTROL INFORMATION IN WIRELESS COMMUNICATION SYSTEM

CROSS-REFERENCE TO RELATED APPLICATION(S)

This application is a continuation application of prior application Ser. No. 17/152,141, filed on Jan. 19, 2021, which is based on and claims priority under 35 U.S.C. § 119(a) of a Korean patent application number 10-2020-0006167, filed on Jan. 16, 2020, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for transmitting and receiving downlink control information in a wireless communication system.

2. Description of Related Art

To meet the increase in demand with respect to wireless data traffic after the commercialization of $4^{th}$ Generation (4G) communication systems, considerable efforts have been made to develop improved $5^{th}$ Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in a millimeter wave (mmWave) band (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, are being developed. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes, and Filter Bank Multi-Carrier (FBMC), Non-Orthogonal Multiple Access (NOMA), and Sparse Code Multiple Access (SCMA), which are advanced access technologies, have been developed.

The Internet has evolved from a human-centered connection network, through which humans generate and consume information, to an Internet of Things (IoT) network that exchanges and processes information between distributed elements such as objects. An Internet of Everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method of efficiently providing these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transmitting and receiving downlink control information in a wireless communication system.

Additional aspects will be set forth in part in the description which follows and, in part, will be apparent from the description, or may be learned by practice of the presented embodiments.

In accordance with an aspect of the disclosure, an operating method of a terminal in a wireless communication system is provided. The operating method includes receiving uplink configuration information from a base station, receiving, from the base station, downlink control information (DCI) including information related to activation of grant-free uplink transmission, identifying the information related to the activation of the grant-free uplink transmission based on the uplink configuration information, and transmitting an uplink signal to the base station based on a result of the identifying.

In accordance with another aspect of the disclosure, an operating method of a base station in a wireless communication system is provided. The operating method includes transmitting uplink configuration information to a terminal, transmitting, to the terminal, downlink control information including information related to activation of grant-free uplink transmission, and receiving an uplink signal from the terminal based on a result of identifying the information related to the activation of the grant-free uplink transmission, wherein the information related to the activation of the grant-free uplink transmission is identified based on the uplink configuration information.

In accordance with another aspect of the disclosure, a terminal in a wireless communication system is provided. The terminal includes a transceiver, and at least one processor configured to receive uplink configuration information from a base station, receive, from the base station, downlink control information including information related to activation of grant-free uplink transmission, identify the information related to the activation of the grant-free uplink transmission based on the uplink configuration information, and transmit an uplink signal to the base station based on a result of the identifying.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
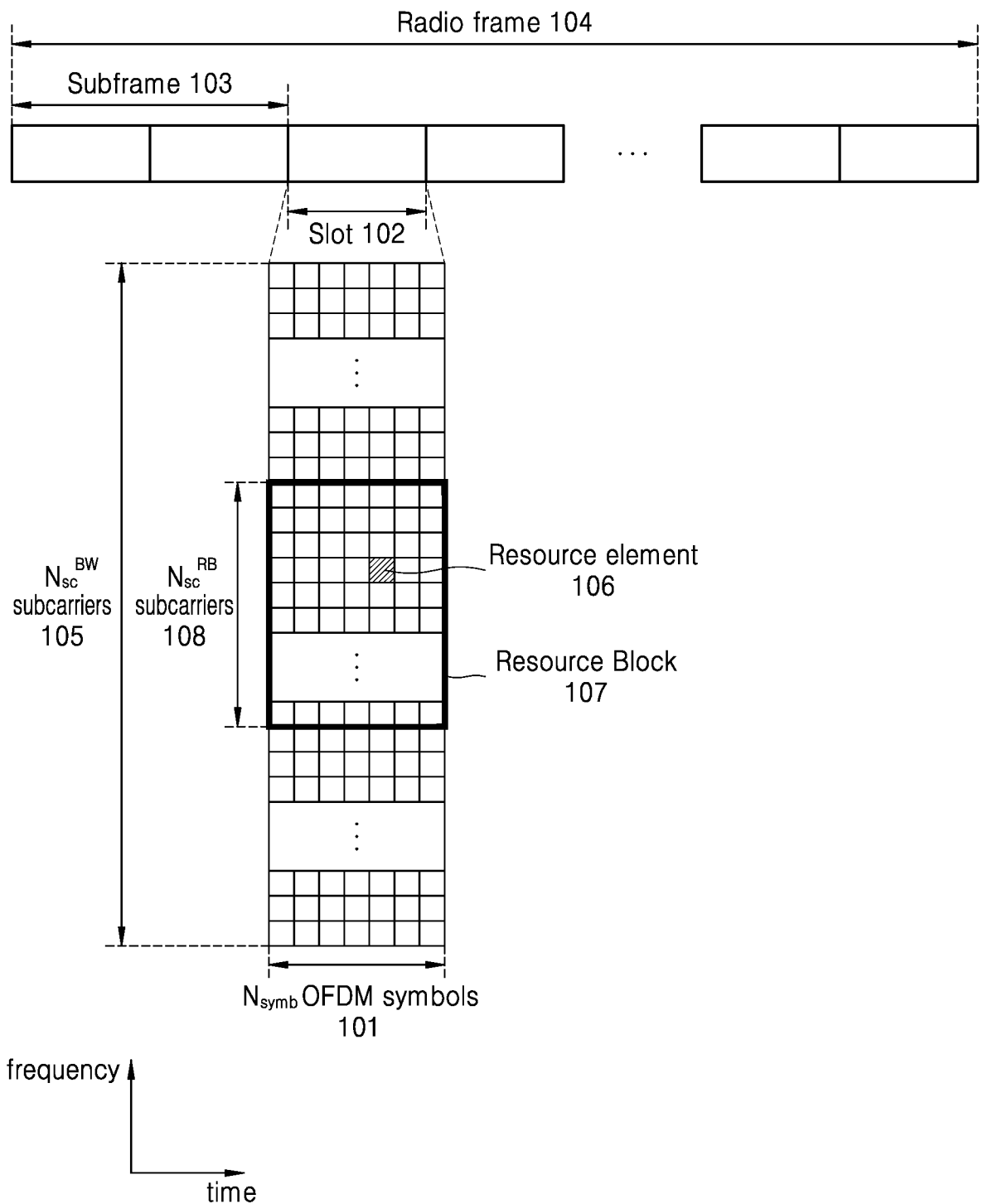
FIG. 1 is a diagram illustrating an uplink/downlink time-frequency domain transmission structure of a New Radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Effects and features of the disclosure, and methods of achieving them will be clarified with reference to embodiments described below in detail with reference to the drawings. In this regard, the embodiments of the disclosure may have different forms and should not be construed as being limited to the descriptions set forth herein. Rather, these embodiments are provided so that the disclosure will be thorough and complete and will fully convey the concept of the embodiments of the disclosure to those of ordinary skill in the art. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be mounted on the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors," or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

As used herein, the term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to objects having an equivalent technical meaning may be used.

For convenience of description, the terms and names defined in the 3$^{rd}$ Generation Partnership Project Long Term Evolution (3GPP LTE) standard are used herein. However, the disclosure is not limited by the terms and names and may be equally applied to systems conforming to other standards. In particular, the disclosure may be applied to 3GPP New Radio (NR) (5$^{th}$ Generation (5G) mobile communication standard). The term evolved Node B ("eNB") as used in the disclosure may be used interchangeably with the term next generation Node B ("gNB") for convenience of descriptions. That is, a base station described as the eNB may represent the gNB. Also, the term "terminal" may refer to not only mobile phones, NB-internet of things (IoT) devices, and sensors, but also other wireless communication devices.

Hereinafter, a base station is configured to assign resources to a terminal, and may include at least one of a gNB, an eNB, a Node B, a base station (BS), a radio access unit, a base station controller, or a node on a network. Examples of a terminal may include a UE, an MS, a cellular phone, a smartphone, a computer, a multimedia system capable of performing a communication function, or the like. The disclosure is not limited to the above examples.

In 5G systems, the support for various services is under consideration, as compared with existing 4G systems. For example, the most representative services may include enhanced mobile broadband (eMBB), ultra-reliable and low latency communication (URLLC), and massive machine type communication (mMTC), and evolved multimedia broadcast/multicast service (eMBMS). A system for providing a URLLC service may be referred to as a URLLC system, and a system for providing an eMBB service may be referred to as an eMBB system. Also, the term "service" and the term "system" may be used interchangeably.

In a communication system, a plurality of services may be provided to a user. In order to provide a plurality of services to a user, a method of providing each service within the same time interval according to the characteristics of the services and an apparatus using the same are required.

In a wireless communication system, for example, an LTE or LTE-advanced (LTE-A) system or a 5G NR system, a base station may transmit a downlink signal to a terminal through a physical downlink control channel (PDCCH). In this case, the downlink signal transmitted to the terminal through the PDCCH may include downlink control information (DCI) including resource assignment information for transmitting the downlink signal. The base station may transmit the DCI including the downlink resource assignment information to the terminal, and thus, the terminal may be configured to receive at least one downlink signal selected from a downlink reference signal (e.g., channel-state information reference signal (CSI-RS)), a broadcast channel (e.g., physical broadcast channel (PBCH)), and a downlink data channel (e.g., physical downlink shared channel (PDSCH)).

For example, the base station may transmit DCI, which instructs to receive the PDSCH in subframe n through the PDCCH, to the terminal in subframe n. The terminal having received the DCI may receive the PDSCH in subframe n based on the received DCI.

Also, in an LTE, LTE-A, or NR system, the base station may transmit the DCI including uplink resource assignment information to the terminal through the PDCCH. The base station may transmit the DCI including the uplink resource assignment information to the terminal, and thus, the terminal may be configured to transmit, to the base station, at least one uplink signal selected from an uplink reference signal (e.g., sounding reference signal (SRS)), uplink control information (UCI), a physical random access channel (PRACH), and an uplink data channel (e.g., physical uplink shared channel (PUSCH)).

For example, the terminal having received uplink transmission configuration information (or uplink DCI, UL grant, etc.) transmitted from the base station through the PDCCH in a subframe n may perform uplink data channel transmission (hereinafter, referred to as PUSCH transmission) based on a predefined time (e.g., n+4) or a time set through a higher layer signal (e.g., n+k), or uplink signal transmission time indicator information (e.g., n+k) included in the uplink transmission configuration information.

When the configured downlink signal is transmitted from the base station to the terminal through an unlicensed spectrum, or when the configured uplink signal is transmitted from the terminal to the base station through an unlicensed spectrum, a transmitting device (the base station or the terminal) may perform a channel access procedure (or listen-before talk (LBT)) for the unlicensed spectrum, in which signal transmission is configured, before or immediately before a set signal transmission start time point. The transmitting device (the base station or the terminal) may perform the configured signal transmission by accessing the unlicensed spectrum when it is determined that the unlicensed spectrum is in an idle state according to a result of performing the channel access procedure. Alternatively, when it is determined that the unlicensed spectrum is not in an idle state or is in an occupied state according to the channel access procedure performed by the transmitting device, the transmitting device is unable to access the unlicensed spectrum, and thus, the transmitting device may not transmit the configured signal. In general, the channel access procedure in the unlicensed spectrum in which the signal transmission is configured is as follows.

For example, the transmitting device may receive a signal in the unlicensed spectrum for a certain time or a time calculated according to a predefined rule (e.g., at least a time calculated through one random value selected by the base station or the terminal). The transmitting device may determine the idle state of the unlicensed spectrum by comparing the strength of the received signal with a threshold predefined or calculated by a function constructed by at least one variable from among a channel bandwidth or a signal bandwidth through which a signal to be transmitted is transmitted, the strength of transmission power, and a beam width of a transmitted signal. For example, when the strength of a signal received for 25 μs by the transmitting device is less than a predefined threshold of −72 dBm, the transmitting device may determine that the unlicensed spectrum is in the idle state and may perform the configured signal transmission. At this time, the maximum possible time for the signal transmission may be limited according to the maximum channel occupancy time defined for each country or region in the unlicensed spectrum or the type of the transmitting device (e.g., a base station or a terminal, or a master device or a slave device).

For example, in Japan, in a 5-GHz unlicensed spectrum, the base station or the terminal may occupy a channel and transmit a signal, after the channel access procedure, without performing an additional channel access procedure for up to 4 ms. When the strength of the signal received for 25 μs is greater than the predefined threshold of −72 dBm, the base station may determine that the unlicensed spectrum is not in the idle state and may not transmit a signal.

In a 5G communication system, various technologies such as a technology capable of transmitting an uplink signal without retransmission of a codeblock group (CBG) unit or uplink scheduling information have been introduced so as to provide various services and support a high data rate. Therefore, when 5G communication is to be performed through the unlicensed spectrum, a more efficient channel access procedure considering various variables is required.

A wireless communication system has evolved from a system providing voice-oriented services to a broadband wireless communication system providing high speed high quality packet data services of communication standards such as High Speed Packet Access (HSPA) of 3GPP, LTE or Evolved Universal Terrestrial Radio Access (E-UTRA), LTE-A, High Rate Packet Data (HRPD) of 3GPP2, Ultra Mobile Broadband (UMB), and IEEE 802.16e. Also, as a 5G wireless communication system, the standards of 5G or NR are being created.

In a wireless communication system including 5G, at least one service selected from eMBB, mMTC, and URLLC may be provided to the terminal. The above-mentioned services may be provided to the same terminal during the same time interval. In an embodiment of the disclosure, eMBB may be a service for high-speed transmission of high-capacity data, mMTC may be a service for minimizing terminal power and accessing multiple terminals, and URLLC may be a service for high reliability and low latency, but the disclosure is not limited thereto. The above-described three services may be a major scenario in LTE systems or post-LTE systems such as 5G/NR systems.

In a case in which the base station schedules data corresponding to the eMBB service to a certain terminal in a specific transmission time interval (TTI), when a situation in which URLLC data has to be transmitted in the TTI occurs, the base station does not transmit part of the eMBB data in a frequency band in which eMBB data is already scheduled and transmitted, and may transmit the generated URLLC data in the frequency band in which the eMBB data is scheduled and transmitted. The eMBB-scheduled terminal and the URLLC-scheduled terminal may be the same terminal or different terminals. In this case, because part of the eMBB data that has already been scheduled and transmitted is not transmitted, the possibility that the eMBB data will be damaged may increase. Therefore, in the above case, it is necessary to determine a signal receiving method and a signal processing method of processing a signal received from an eMBB-scheduled terminal or a URLLC-scheduled terminal.

In the disclosure, a downlink (DL) may refer to a radio transmission path of a signal transmitted from the base station to the terminal, and an uplink (UL) may refer to a radio transmission path of a signal transmitted from the terminal to the base station. Also, as the embodiment of the disclosure, an LTE or LTE-A system will be described as an example, but the embodiment of the disclosure may also be applied to other communication systems having a similar technical background or channel type. Examples thereof may include 5G mobile communication technologies (e.g., 5G, NR, etc.) developed after LTE-A.

In an NR system as a representative example of a broadband wireless communication system, an orthogonal frequency division multiplexing (OFDM) scheme is employed in the downlink, and both of OFDM and single carrier frequency division multiple access (SC-FDMA) schemes are employed in the uplink. The uplink may refer to a radio link through which the terminal (or UE, MS, etc.) transmits data or control signals to the base station (or eNB, BS, etc.), and the downlink may refer to a radio link through which the base station transmits data or control signals to the terminal. According to the multiple access scheme as described above, data or control information may be usually assigned and operated so that the time-frequency resources to carry the data or control information for each user do not overlap each other, that is, orthogonality is established, and thus the data or control information of each user may be identified.

The NR system employs a hybrid automatic repeat request (HARQ) scheme in which corresponding data is retransmitted in a physical layer when a decoding failure occurs in initial transmission. In the HARQ scheme, when a receiver fails to correctly decode data, the receiver transmits information (negative acknowledgement (NACK)) notifying a transmitter of the decoding failure, so that the transmitter retransmits the corresponding data in a physical layer. The receiver may improve data reception performance by combining the data retransmitted by the transmitter with the data that has previously failed to be decoded. Also, when the receiver correctly decodes data, information (acknowledgement (ACK)) notifying the transmitter of a decoding success may be transmitted to the transmitter, so that the transmitter may transmit new data.

FIG. 1 is a diagram illustrating an uplink/downlink time-frequency domain transmission structure of an NR system according to an embodiment of the disclosure. The time-frequency domain refers to a radio resource region through which data or control channels are transmitted in an uplink and/or a downlink.

Referring to FIG. 1, a horizontal axis may represent a time domain and a vertical axis may represent a frequency domain. A minimum transmission unit in the time domain is an OFDM or DFT-s-OFDM symbol, and $N_{symb}$ OFDM or DFT-s-OFDM symbols 101 may be gathered to constitute one slot 102. The OFDM symbol may refer to a symbol for a case of transmitting and receiving a signal using an OFDM multiplexing scheme, and the DFT-s-OFDM symbol may refer to a symbol for a case of transmitting and receiving a signal using a DFT-s-OFDM or SC-FDMA multiplexing scheme. In the disclosure, for convenience of description, the OFDM symbols will be commonly used without distinction between the OFDM symbols and the DFT-s-OFDM symbols. The following description will be given based on transmission and reception of downlink signals, but may also be applied to transmission and reception of uplink signals.

When subcarrier spacing (SCS) is 15 kHz, one slot may be gathered to constitute one subframe 103 and lengths of the slot and the subframe may be 1 ms, respectively. In this case, the number of slots and the length of the slots constituting one subframe 103 may change according to the subcarrier spacing. For example, when the subcarrier spacing is 30 kHz, four slots may be gathered to constitute one subframe 103. In this case, the length of the slot may be 0.5 ms and the length of the subframe may be 1 ms. A radio frame 104 may refer to a time domain interval including 10 subframes. A minimum transmission unit in the frequency domain is a subcarrier, and an entire system transmission bandwidth may include $N_{BW}$ subcarriers 105. However, these specific values may be applied variably. For example, in the LTE system, the subcarrier spacing is 15 kHz, but two slots are gathered to constitute one subframe 103. In this case, the length of the slot is 0.5 ms and the length of the subframe is 1 ms.

A basic unit of the resource in the time-frequency domain is a resource element (RE) 106, which may be represented by an OFDM symbol index and a subcarrier index. A resource block (RB) 107 or a physical resource block (PRB) may be defined as $N_{symb}$ consecutive OFDM symbols 101 in the time domain and $N_{SC}^{RB}$ consecutive subcarriers 108 in the frequency domain. Therefore, one RB 107 in one slot may include $N_{symb} \times N_{SC}^{RB}$ REs. In general, a minimum allocation unit of data in the frequency domain is the RB 107. In the NR system, it is general that $N_{symb}=14$, $N_{SC}^{RB}=12$, and the number $N_{RB}$ of RBs may change according to the system transmission bandwidth. In the LTE system, it is general that $N_{symb}=7$, $N_{SC}^{RB}=12$, and $N_{RB}$ may change according to the system transmission bandwidth.

DCI may be transmitted within the first N OFDM symbols in the subframe. In general, N={1, 2, 3}, and the terminal may be configured with the number of symbols through which DCI may be transmitted from the base station through a higher layer signal. Alternatively, the base station may differently set the number of symbols, through which DCI may be transmitted in the slot, for each slot according to the amount of control information to be transmitted in the current slot. The base station may transmit information about the number of symbols to the terminal through a separate downlink control channel.

In the NR or LTE system, scheduling information for downlink data or uplink data may be transmitted from the base station to the terminal through DCI. The DCI is defined according to several formats and may indicate whether the DCI is scheduling information (UL grant) for uplink data or scheduling information (DL grant) for downlink data, whether the DCI is compact DCI having a small size of control information, whether the control information is fallback DCI, whether to apply spatial multiplexing using multiple antennas, and whether the DCI is power control DCI, according to each format. For example, the DCI format (e.g., DCI format 1_0 of NR), which is the scheduling information (DL grant) for the downlink data, may include at least one piece of the following control information.

Control information identifier (DCI format identifier): identifier that identifies the received DCI format.
Frequency domain resource assignment (FDRA): which indicates RBs assigned for data transmission.
Time domain resource assignment (TDRA): indicates slots and symbols assigned for data transmission.
Virtual RB (VRB)-to-PRB mapping: indicates whether to apply VRB mapping
Modulation and coding scheme (MCS): indicate a modulation scheme used for data transmission and a size of a transport block, which is data to be transmitted.
New data indicator: indicates whether HARQ initial transmission or retransmission.
Redundancy version: indicates a redundancy version of HARQ.
HARQ process number: indicates a process number of HARQ.
PDSCH assignment information (downlink assignment index): indicate, to the terminal, the number of PDSCH reception results (e.g., the number of HARQ-ACKs) to be reported to the base station.
Transmit power control (TPC) command for physical uplink control channel (PUCCH): indicates a TPC command for PUCCH, which is an uplink control channel.
PUCCH resource indicator: indicates PUCCH resources used for HARQ-ACK report including reception results for PDSCH configured through the corresponding DCI.
PUCCH transmission timing indicator (PDSCH-to-HARQ_feedback timing indicator): indicates information about slots or symbols to transmit PUCCH for HARQ-ACK report including reception results for PDSCH configured through the corresponding DCI.

According to an embodiment of the disclosure, the DCI may be transmitted on a PDCCH (or control information, hereinafter used interchangeably) or an enhanced PDCCH (EPDCCH) (or enhanced control information, hereinafter used interchangeably) through a channel coding and modulation process.

In general, the DCI may be scrambled by a specific radio network temporary identifier (RNTI) (or terminal identifier C-RNTI) independently for each terminal to add a cyclic redundancy check (CRC), and may be channel-coded, configured as an independent PDCCH, and then transmitted. In the time domain, the PDCCH may be mapped and transmitted during a control channel transmission interval. A frequency domain mapping position of the PDCCH may be determined by the identifier (ID) of each terminal and may be transmitted while spreading over the entire system transmission bandwidth.

According to an embodiment of the disclosure, the downlink data may be transmitted on a PDSCH, which is a physical channel for transmitting downlink data. The PDSCH may be transmitted after the control channel transmission interval, and scheduling information such as a specific mapping position and a modulation scheme in the frequency domain may be determined based on the DCI transmitted through the PDCCH. The base station may notify the terminal of the modulation scheme applied to the PDSCH to be transmitted and the size of the data to be transmitted (transport block (TB) size (TBS)) through an MCS among the pieces of control information constituting the DCI. According to an embodiment of the disclosure, the MCS may include 5 bits, or more or fewer bits. The TBS may refer to a size before channel coding for error correction is applied to data (TB) to be transmitted by the base station.

The modulation schemes supported by the NR system include quadrature phase shift keying (QPSK), quadrature amplitude modulation (16QAM), 64QAM, and 256QAM, and the modulation orders (Qm) thereof are 2, 4, and 6. That is, in the case of QPSK modulation, 2 bits per symbol may be transmitted; in the case of 16QAM modulation, 4 bits per symbol may be transmitted; in the case of 64QAM modulation, 6 bits per symbol may be transmitted; and in the case of 256QAM modulation, 8 bits per symbol may be transmitted. Also, a modulation scheme of 256QAM or higher may be used according to system modification.

In the NR system, the uplink/downlink HARQ employs an asynchronous HARQ scheme in which a data retransmission time point is not fixed. For example, in the case of the downlink, when HARQ NACK is fed back to the base station from the terminal with respect to initial transmission data transmitted by the base station, the base station may freely determine the retransmission data transmission time point through the scheduling operation. The terminal may buffer data determined as an error as a result of decoding the received data for the HARQ operation, and then perform combining with data retransmitted from the base station. HARQ ACK/NACK information of the PDSCH transmitted in subframe n-k may be transmitted from the terminal to the base station through PUCCH or PUSCH in subframe n. In the 5G communication system such as NR, a k value may be included in the DCI indicating or scheduling the reception of the PDSCH transmitted in subframe n-k and transmitted, or may be set to the terminal through the higher layer signal. In this case, the base station may set one or more k values as the higher layer signal and may indicate a specific k value through the DCI. In this case, k may be determined according to the HARQ-ACK processing capability of the terminal, that is, the minimum time required for the terminal to receive the PDSCH and generate and report the HARQ-ACK for the PDSCH. Also, the terminal may use a predefined value or a default value until the k value is set.

Although the wireless communication system and the method and apparatus described in the embodiment of the disclosure have been described based on the NR system, the contents of the disclosure are not limited to the NR system, but may be applied to various wireless communication systems such as LTE, LTE-A, LTE-A-Pro, and 5G. Also, although the disclosure is described based on a system and device for transmitting and receiving signals using an unlicensed spectrum, the contents of the disclosure may be applied to systems operating in a licensed spectrum.

Hereinafter, in the disclosure, higher layer signaling or higher layer signal may refer to a method of transmitting signals from the base station to the terminal using a downlink data channel of a physical layer, or a method of transmitting signals from the terminal to the base station by using an uplink data channel of a physical layer. The higher layer signaling or the higher layer signal may include a method of transmitting signals transmitted through a media access control (MAC) control element (MAC CE), radio resource control (RRC) signaling, or packet data convergence protocol (PDCP) signaling. Also, system information commonly transmitted to a plurality of terminals, for example, a system information block (SIB), may be included in the higher layer signaling or the higher layer signal.

In the case of a system that performs communication in an unlicensed spectrum, a transmitting device (a base station or a terminal) that intends to transmit a signal through the unlicensed spectrum may perform a channel access procedure (or LBT) for the unlicensed spectrum on which communication is to be performed before transmitting the signal, and may perform signal transmission by accessing the unlicensed spectrum when the unlicensed spectrum is determined as being in an idle state according to the channel access procedure. When the unlicensed spectrum is determined as not being in an idle state according to the channel access procedure, the transmitting device may not be able to perform signal transmission.

In general, the channel access procedure in the unlicensed spectrum may refer to a procedure that measures the strength of a signal that the transmitting device receives through the unlicensed spectrum for a fixed time or a time calculated according to a predefined rule (e.g., at least a time calculated through one random value selected by the base station or the terminal), and determines the idle state of the unlicensed spectrum by comparing the strength of the signal with a threshold predefined or calculated by a function that is constructed by at least one variable from among a channel bandwidth or a signal bandwidth through which a signal to be transmitted is transmitted, and the strength of transmission power and determines the received signal strength.

For example, the transmitting device may measure the strength of the signal for X μs (e.g., 25 μs) immediately before the time at which the signal is to be transmitted, may determine that the unlicensed spectrum is in an idle state when the measured strength of the signal is less than a predefined or calculated threshold T (e.g., −72 dBm), and transmit the set signal. In this case, after the channel access procedure, the maximum time for continuous signal transmission may be limited according to the maximum channel occupancy time defined for each country, region, and frequency band according to each unlicensed spectrum, and may also be limited according to the type of the transmitting device (e.g., a base station or a terminal, or a master device or a slave device). For example, in Japan, in a 5-GHz unlicensed spectrum, the base station or the terminal may occupy the channel and transmit the signal without performing an additional channel access procedure for up to 4 ms with respect to the unlicensed spectrum determined as the idle state after the channel access procedure.

More specifically, when the base station or the terminal intends to transmit the downlink or uplink signal in the unlicensed spectrum, the channel access procedure that may be performed by the base station or the terminal may be classified into the following types.

Type 1: Uplink/downlink signal transmission after performing channel access procedure for variable time Type 2: Uplink/downlink signal transmission after performing channel access procedure for fixed time Type 3: Transmission of downlink or uplink signal without performing channel access procedure Hereinafter, in the disclosure, a case in which the base station transmits the downlink signal to the terminal through the unlicensed spectrum and a case in which the terminal transmits the uplink signal to the base station through the unlicensed spectrum are described in a mixed manner, but the contents described in the disclosure may be applied to a case in which the terminal transmits the uplink signal to the base station through the unlicensed spectrum or a case in which the base station transmits the downlink signal to the terminal through the unlicensed spectrum in the same manner or in a partially modified manner. Therefore, detailed description of downlink signal transmission and reception will be omitted. Also, in the disclosure, the following description will be given on the assumption that one piece of downlink data information (codeword or TB) or uplink data information is transmitted and received between the base station and the terminal. However, the contents described in the disclosure may also be applied to a case in which a base station transmits a downlink signal to a plurality of terminals, or a case in which a plurality of codewords or TBs are transmitted and received between a base station and a terminal.

According to an embodiment of the disclosure, a transmitting node (hereinafter referred to as a base station or a terminal) that intends to transmit signals in an unlicensed spectrum may determine a channel access procedure scheme according to the type of signal to be transmitted. For example, when the base station intends to transmit a downlink signal including a downlink data channel in an unlicensed spectrum, the base station may perform a channel access procedure of a type 1 scheme. When the base station intends to transmit a downlink signal not including a downlink data channel in an unlicensed spectrum, for example, when the base station intends to transmit a synchronization signal or a downlink control channel, the base station may perform a channel access procedure of a type 2 scheme and transmit the downlink signal.

In this case, the channel access procedure scheme may be determined according to the transmission length of the signal to be transmitted in the unlicensed spectrum or the length of the time or interval used by occupying the unlicensed spectrum. In general, the channel access procedure of the type 1 scheme may have to be performed for a longer time than the channel access procedure of the type 2 scheme. Therefore, when a signal is to be transmitted for a short time interval or a time less than or equal to a reference time (e.g., X ms or Y symbols), the channel access procedure of the type 2 scheme may be performed. When a signal is to be transmitted for a long time interval or a time greater than or equal to a reference time (e.g., X ms or Y symbols), the channel access procedure of the type 1 scheme may be performed. That is, channel access procedures of different schemes may be performed according to the use time of the unlicensed spectrum.

When the channel access procedure of the type 1 scheme is performed according to at least one of the above-described criteria, a channel access priority class (CAPC) may be determined according to a quality of service class identifier (QCI) of a signal to be transmitted in an unlicensed spectrum. The channel access procedure may be performed using at least one of predefined set values as shown in Table 1 below with respect to the determined CAPC. For example, QCIs 1, 2, and 4 may refer to QCI values for services such as conversational voice, conversational video (live streaming), and non-conversational video (buffered streaming), respectively. When intending to transmit a signal for a service not matching a QCI of Table 1 to an unlicensed spectrum, a method of selecting a QCI closest to the QCI of Table 1 and the service and selecting a corresponding CAPC may be used.

Table 1 below shows a mapping relationship between CAPC and QCI.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, a set ($CW_p$) of a defer duration and a contention window value or size according to the determined CAPC (hereinafter also referred to as p), a minimum value ($CW_{min,p}$) and a maximum value ($CW_{max,p}$) of the contention window, a maximum channel occupancy time ($T_{mcot,p}$), and the like may be determined from Table 2 below. That is, the base station that intends to transmit a downlink signal in an unlicensed spectrum may perform a channel access procedure for the unlicensed spectrum for a minimum of $T_f + m_p * T_{sl}$. When intending to perform the channel access procedure with CAPC 3 (p=3), the size $T_f + m_p * T_{sl}$ of the defer duration required to perform the channel access procedure may be set using $m_p = 3$. When the unlicensed spectrum is determined as being in an idle state in all $m_p * T_{sl}$, N=N−1. In this case, N may be selected as any integer value between 0 and the value $CW_p$ of the contention window at the time of performing the channel access procedure. In the case of CAPC 3, the minimum value and the maximum value of the contention window may be 15 and 63, respectively. When the unlicensed spectrum is determined as being in an idle state in the defer duration and the additional channel access procedure duration, the base station may transmit a signal through the unlicensed spectrum for $T_{mcot,p}$ (8 ms). Table 2 shows a CAPC in a downlink. For convenience of description, the disclosure will be described using a downlink CAPC. However, In the case of an uplink, the CAPC of Table 2 may be reused, or a CAPC for uplink transmission may be defined and used.

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The base station may configure channel access procedure performance information required for uplink transmission of the terminal through higher layer signaling (e.g., SIB, MIB, MAC-CE, or RRC signaling) using a table. Each column of the table may include at least one of a channel access type, a CAPC, a cyclic prefix (CP) extension value of uplink (or downlink) OFDM symbol transmission, or a timing advance (TA) value. For example, when the base station instructs the terminal to perform uplink transmission in DCI format 0_0, the base station may indicate, to the terminal, information required for a channel access procedure and uplink transmission by indicating a column corresponding to Table 3 below with a 2-bit "ChannelAccess-CPext" field included in the corresponding DCI format.

TABLE 3

| Bit field mapped to index | Channel Access Type | CP extension |
|---|---|---|
| 0 | Type 3 | C2*symbol length-16 us-TA |
| 1 | Type 2 | C3*symbol length-25 us-TA |
| 2 | Type 2 | C1*symbol length-25 us |
| 3 | Type1 | 0 |

When the base station instructs the terminal to perform uplink transmission in DCI format 0_1, the base station may indicate, to the terminal, information required for a channel access procedure and uplink transmission using a "ChannelAccess-CPext" field included in the corresponding DCI format and Table 4.

TABLE 4

| Entry index | Channel Access Type | CP extension | CAPC |
|---|---|---|---|
| 0 | Type3 | 0 | 1 |
| 1 | Type3 | 0 | 2 |
| 2 | Type3 | 0 | 3 |
| 3 | Type3 | 0 | 4 |
| 4 | Type3 | C2*symbol length-16 us-TA | 1 |
| 5 | Type3 | C2*symbol length-16 us-TA | 2 |
| 6 | Type3 | C2*symbol length-16 us-TA | 3 |
| 7 | Type3 | C2*symbol length-16 us-TA | 4 |
| 8 | Type2 with 16 us | 0 | 1 |
| 9 | Type2 with 16 us | 0 | 2 |
| 10 | Type2 with 16 us | 0 | 3 |
| 11 | Type2 with 16 us | 0 | 4 |
| 12 | Type2 with 16 us | C2*symbol length-16 us-TA | 1 |
| 13 | Type2 with 16 us | C2*symbol length-16 us-TA | 2 |
| 14 | Type2 with 16 us | C2*symbol length-16 us-TA | 3 |
| 15 | Type2 with 16 us | C2*symbol length-16 us-TA | 4 |
| 16 | Type2 with 25 us | 0 | 1 |
| 17 | Type2 with 25 us | 0 | 2 |
| 18 | Type2 with 25 us | 0 | 3 |
| 19 | Type2 with 25 us | 0 | 4 |
| 20 | Type2 with 25 us | 1*symbol length-25 us | 1 |
| 21 | Type2 with 25 us | 1*symbol length-25 us | 2 |
| 22 | Type2 with 25 us | 1*symbol length-25 us | 3 |
| 23 | Type2 with 25 us | 1*symbol length-25 us | 4 |
| 24 | Type2 with 25 us | C3*symbol length-25 us-TA | 1 |
| 25 | Type2 with 25 us | C3*symbol length-25 us-TA | 2 |
| 26 | Type2 with 25 us | C3*symbol length-25 us-TA | 3 |
| 27 | Type2 with 25 us | C3*symbol length-25 us-TA | 4 |
| 28 | Type1 | 0 | 1 |
| 29 | Type1 | 0 | 2 |
| 30 | Type1 | 0 | 3 |
| 31 | Type1 | 0 | 4 |
| 32 | Type1 | 1*symbol length-25 us | 1 |
| 33 | Type1 | 1*symbol length-25 us | 2 |
| 34 | Type1 | 1*symbol length-25 us | 3 |
| 35 | Type1 | 1*symbol length-25 us | 4 |
| 36 | Type1 | C2*symbol length-16 us-TA | 1 |
| 37 | Type1 | C2*symbol length-16 us-TA | 2 |
| 38 | Type1 | C2*symbol length-16 us-TA | 3 |
| 39 | Type1 | C2*symbol length-16 us-TA | 4 |
| 40 | Type1 | C3*symbol length-25 us-TA | 1 |
| 41 | Type1 | C3*symbol length-25 us-TA | 2 |
| 42 | Type1 | C3*symbol length-25 us-TA | 3 |
| 43 | Type1 | C3*symbol length-25 us-TA | 4 |

The base station may configure at least one entry in the columns of Table 4 to the terminal through higher level signaling, and the terminal may receive, from the base station, an indication of one of at least one entry of Table 4 configured by the base station as the "ChannelAccess-CPext" field. In this case, the size of the "ChannelAccess-CPext" field may be determined to be, $\lceil \log_2(1) \rceil$ wherein I may refer to the number of entries configured through higher level signaling by the base station.

According to an embodiment of the disclosure, the initial contention window value ($CW_p$) may refer to the minimum value ($CW_{min,p}$) of the contention window. The base station that selects an N value may perform a channel access procedure in a $T_{sl}$ duration. When the base station determines that an unlicensed spectrum is in an idle state through the channel access procedure performed in the $T_{sl}$ duration, the base station may change the value to N=N−1. When N=0, the base station may transmit a signal for maximum $T_{mcot,p}$ through the unlicensed spectrum. When the unlicensed spectrum determined through the channel access procedure in the $T_{sl}$ duration is not in an idle state, the base station may perform the channel access procedure again without changing the N value.

According to an embodiment of the disclosure, the value $CW_p$ of the competition window may be changed based on a reception result for a downlink data channel in a reference subframe or a reference slot among a time at which the base station starts the channel access procedure, a time at which the base station selects the N value so as to perform the channel access procedure, or a downlink signal transmission interval (or maximum channel occupancy time (MCOT)) most recently transmitted by the base station through the unlicensed spectrum immediately before the time. In other words, the base station may receive a report of reception results of the terminal for downlink data transmitted in the reference subframe or the reference slot, and may increase or minimize the magnitude of $CW_p$ according to the proportion Z of NACK among the reported reception results.

Figure 2:
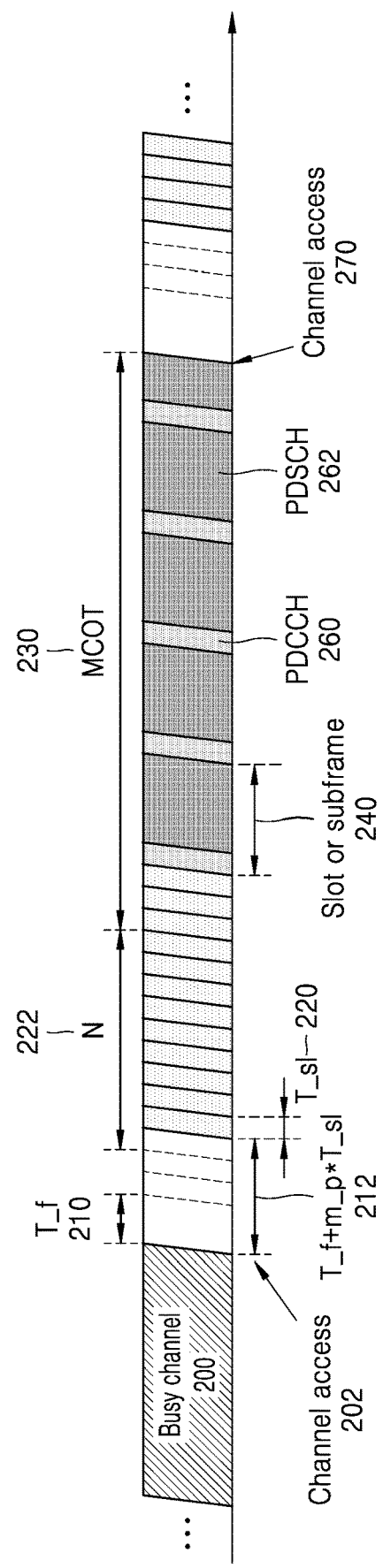
FIG. 2 is a diagram illustrating a channel access procedure in an unlicensed spectrum according to an embodiment of the disclosure.

FIG. 2 is a diagram illustrating a channel access procedure in an unlicensed spectrum according to an embodiment of the disclosure.

Referring to FIG. 2, a channel access procedure start time 270 at which the base station starts the channel access procedure, a time at which the base station selects the N value 222 so as to perform the channel access procedure, or a first transmission interval (hereinafter, a slot 240 or a subframe 240) of a downlink signal transmission interval (MCOT) 230 most recently transmitted through the unlicensed spectrum immediately before the time may be a reference slot for changing a contention window for a channel access procedure (in this case, the channel access procedure start time 270). In the downlink signal transmission interval (MCOT) 230, PDCCH 260 and PDSCH 262 may be transmitted. When the base station is unable to receive the report of the reception results for the downlink data channel transmitted in the first slot 240 of the transmission interval 230, for example, when the time interval between the first subframe and the channel access procedure start time 270 of the base station is less than n slots or subframes, that is, when the base station starts the channel access procedure before the time at which the terminal is able to report the downlink data channel reception results for the first subframe 240, the first subframe of the most recent downlink signal transmission interval transmitted before the downlink signal transmission interval 230 may be a reference subframe. In other words, when the reception results for the downlink data transmitted in the reference subframe 240 are not received from the terminal at the channel access procedure start time 270 of the base station, the time at which the base station selects the N value so as to perform the channel access procedure, or immediately before the time, the base station may determine, as the reference subframe, the first subframe of the downlink signal transmission interval most recently transmitted among the reception results for the downlink data channel previously received from the terminals. The base station may use the downlink data reception results, which are received from the terminals with respect to the downlink data transmitted through the downlink data channel in the reference subframe, to determine the size of the contention window used in the channel access procedure (in this case, the channel access procedure start time 270).

For example, when 80% or more of the reception results of the terminal for downlink data transmitted to the terminal through the downlink data channel in the first subframe among the downlink signals transmitted through the unlicensed spectrum are determined to be NACK, the base station that transmits a downlink signal through a channel access procedure (e.g., $CW_p=15$) configured through CAPC 3 (p=3) may increase the contention window from the initial value ($CW_p=15$) to a value ($CW_p=31$) of a next contention window.

When 80% or more of the reception results of the terminal are not determined to be NACK, the base station may maintain the value of the contention window as the existing value or change to the initial value of the contention window. In this case, the change of the contention window may be commonly applied to all types of CAPC, or may be applied only to the type of CAPC used in the channel access procedure. In this case, in the reference subframe or the reference slot for determining the change in the size of the contention window, a method of determining a reception result effective in determining the change in the size of the contention window among the reception results for downlink data transmitted or reported to the base station by the terminal with respect to downlink data transmitted through the downlink data channel, that is, a method of determining a Z value is as follows.

When the base station transmits one or more codewords or TBs to one or more terminals in the reference subframe or the reference slot, the base station may determine the Z value based on the proportion of NACK among reception results transmitted or reported by the terminal with respect to the TBs received in the reference subframe or the reference slot. For example, when two codewords or two TBs are transmitted to one terminal in the reference subframe or the reference slot, the base station may receive or be reported the reception results for the downlink data signal with respect to two TBs from the terminal. When the proportion Z of NACK among the two reception results is equal to or greater than a threshold (e.g., Z=80%) predefined or set between the base station and the terminal, the base station may change or increase the size of the contention window.

In this case, when the terminal bundles the reception results for the downlink data with respect to one or more subframes (e.g., M subframes) including the reference subframe or slot and transmits or reports the bundled reception results to the base station, the base station may determine that the terminal has transmitted M reception results. The base station may determine the Z value based on the proportion of NACK among the M reception results, and may change, maintain, or initialize the size of the contention window.

When the reference subframe is the reception result for the second slot between the two slots constituting one subframe, the Z value may be determined based on the proportion of NACK among the reception results transmitted or reported to the base station by the terminal with respect to the downlink data received in the reference subframe (i.e., the second slot) and the subsequent subframe.

Also, the base station may determine the reception result of the terminal as NACK and determine the Z value when scheduling information or downlink control information for the downlink data channel transmitted by the base station is transmitted in the same cell or frequency band as the cell or frequency band through which the downlink data channel is transmitted, when scheduling information or downlink control information for the downlink data channel transmitted by the base station is transmitted through an unlicensed spectrum, but is transmitted in a cell different from a cell through which the downlink data channel is transmitted, or at a different frequency, when it is determined that the terminal has not transmitted the reception result for the downlink data received in the reference subframe or the reference slot, and when it is determined as discontinuous transmission (DTX), NACK/DTX, or any state among the reception results for the downlink data transmitted by the terminal.

Also, the base station may not include the reception result of the terminal in the reference value Z of the contention window variation when scheduling information or downlink control information for the downlink data channel transmitted by the base station is transmitted through the licensed spectrum, and when the reception result for the downlink data transmitted by the terminal is determined as DTX, NACK/DTX, or any state. In other words, the base station may ignore the reception result of the terminal and determine the Z value.

Also, when the base station transmits scheduling information or downlink control information for the downlink data channel through the licensed spectrum, and when the base station does not actually transmit the downlink data among the reception results for the downlink data with respect to the reference subframe or the reference slot transmitted or reported to the base station by the terminal (no transmission), the base station may ignore the reception result transmitted or reported by the terminal with respect to the downlink data and determine the Z value.

In an embodiment of the disclosure, the example of the FIG. 2 may include busy channel 200. The base station may start the channel access procedure at a channel access procedure start time 202. And, the base station may perform a channel access procedure for the unlicensed spectrum during $T_f+m_p*T_{sl}$ interval 212. The $T_f+m_p*T_{sl}$ interval 212 may be configured of $T_f$ time 210 and $T_{sl}$ time 220.

In the 5G system, it is necessary to define and operate the frame structure in a flexible manner, considering various services and requirements. For example, each service may have different subcarrier spacing according to the requirements. The current 5G communication system supports a plurality of subcarrier spacings, and the subcarrier spacing may be determined using Equation 1 as follows.

$$\Delta f = f_0 2^m \qquad \text{Equation 1}$$

$f_0$ may represent a basic subcarrier spacing (SCS) of a system, and m may represent an integer scaling factor. For example, when $f_0$ is 15 kHz, a subcarrier spacing set that is usable by the 5G communication system may be configured as 3.75 kHz, 7.5 kHz, 15 kHz, 30 kHz, 60 kHz, 120 kHz, 240 kHz, 480 kHz, and the like. The usable subcarrier spacing set may be different according to a frequency band. For example, 3.75 kHz, 7.5 kHz, 15 kHz, 30 kHz, and 60 kHz may be used in a frequency band of 6 GHz or less, and 60 kHz, 120 kHz, and 240 kHz may be used in a frequency band of 6 GHz or more.

The length of the OFDM symbol may change according to the subcarrier spacing constituting the OFDM symbol. This is because the subcarrier spacing and the length of the OFDM symbol have a reciprocal relationship due to the characteristics of the OFDM symbol. For example, when the subcarrier spacing is doubled, the symbol length is reduced to ½. Conversely, when the subcarrier spacing is reduced to ½, the symbol length may be doubled. Next, a resource region through which a data channel is transmitted in a 5G communication system will be described with reference to FIG. 3.

Figure 3:
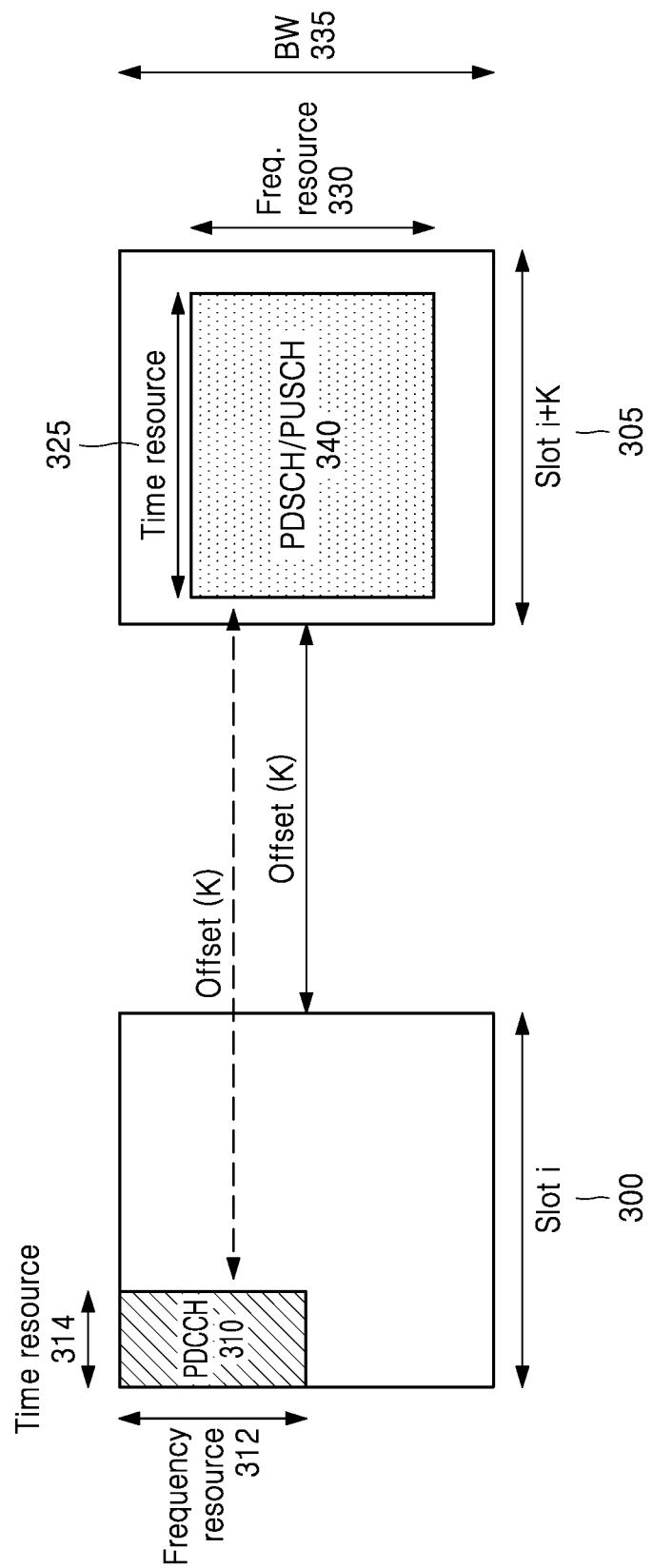
FIG. 3 is a diagram illustrating a downlink or uplink scheduling method and a resource region in an NR system according to an embodiment of the disclosure.

FIG. 3 is a diagram illustrating a downlink or uplink scheduling method and a resource region in an NR system according to an embodiment of the disclosure.

Referring to FIG. 3, the terminal may monitor or search a PDCCH 310 in a downlink control channel (hereinafter referred to as PDCCH) region (hereinafter referred to as a control resource set (CORESET) or a search space (SS)) configured from a base station through a higher layer signal. In this case, the downlink control channel region may include information of a time domain (or resource) 314 and a frequency domain (or resource) 312. The information of the time domain 314 may be set in units of symbols, and the information of the frequency domain 312 may be set in units of RBs or RB groups. When the terminal detects the PDCCH 310 in slot (index) i 300, the terminal may obtain DCI transmitted through the detected PDCCH 310. Through the received DCI, the terminal may obtain scheduling information for a downlink data channel or an uplink data channel. In other words, the DCI may include resource region (or PDSCH transmission region) information in which at least the terminal has to receive the downlink data channel (hereinafter referred to as PDSCH) transmitted from the base station, or the resource region information that the terminal is assigned from the base station so as to transmit the uplink data channel (PUSCH).

For example, a case in which the terminal is scheduled to transmit the uplink data channel (PUSCH) is as follows. The terminal having received the DCI may obtain a slot index or offset information K for receiving the PUSCH through the DCI, and determine a PUSCH transmission slot index. For example, based on the slot index i 300 at which the PDCCH 310 is received, the terminal may determine that the PUSCH is scheduled to transmit in slot i+K 305 through the received offset information K. In this case, the terminal may determine slot i+K 305 or a PUSCH start symbol or time in slot i+K through the received offset information K based on the CORESET receiving the PDCCH 310. Also, the terminal may obtain, from the DCI, information about a PDSCH/PUSCH transmission time-frequency resource domain 340 in the PUSCH transmission slot i+K 305. In this case, PUSCH transmission frequency resource domain information 330 may be PRB or PRB group unit information. The PUSCH transmission frequency resource domain information 330 may refer to a domain included in an initial uplink bandwidth (BW) or an initial uplink bandwidth part (BWP) determined by or configured for the terminal through an initial access procedure. When the terminal is configured with an uplink BW or an uplink BWP through a higher layer signal, the PUSCH transmission frequency resource domain information 330 may refer to a domain included in the uplink BW or the uplink BWP configured through the higher layer signal. A BW 335 may refer to a bandwidth corresponding to slot i 300 and slot i+K.

The PUSCH transmission time resource region information 325 may be symbol or symbol group unit information, or information indicating absolute time information. In this case, the PUSCH transmission time resource region information 325 may be expressed as a combination of PUSCH transmission start time or symbol, a length of PUSCH, or a PUSCH end time or symbol, and may be included in the DCI as one field or value. In this case, the PUSCH transmission time resource region information 325 may be included in the DCI as fields or values respectively representing PUSCH transmission start time or symbol, a length of PUSCH, or a PUSCH end time or symbol. The terminal may transmit the PUSCH in the PUSCH transmission resource region 340 determined through the above-described DCI.

Hereinafter, a downlink control channel in a 5G communication system will be described in more detail with reference to the accompanying drawings.

Figure 4:
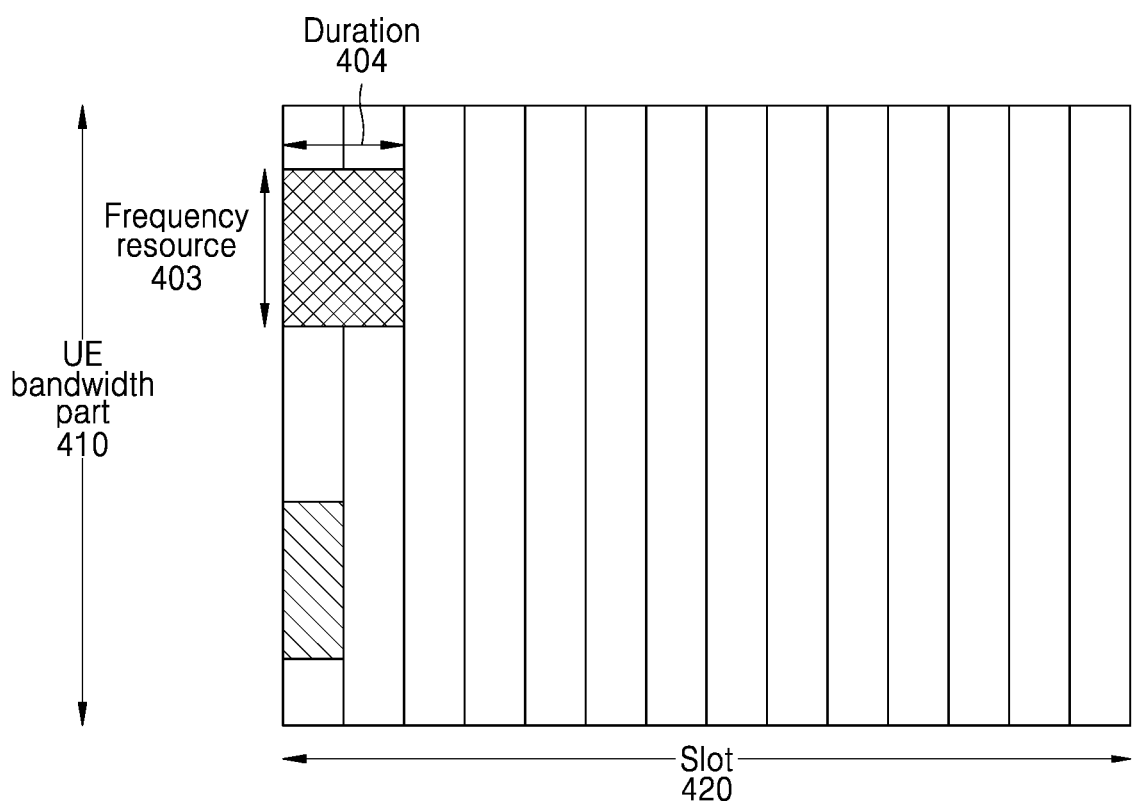
FIG. 4 is a diagram illustrating an example of a configuration of a control resource set for a downlink control channel in an NR system according to an embodiment of the disclosure.
Figure 4:
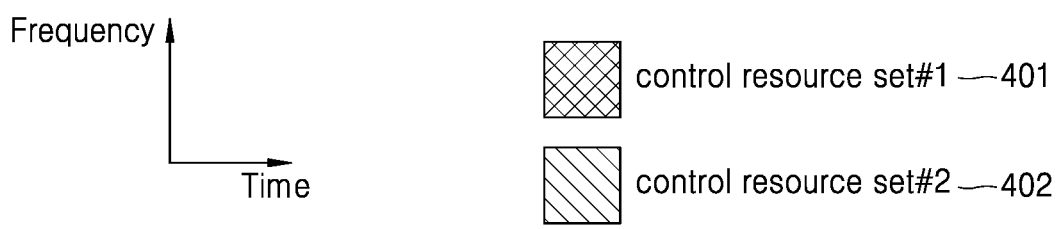

FIG. 4 is a diagram illustrating an example of a configuration of a control resource set for a downlink control channel in an NR system according to an embodiment of the disclosure. That is, FIG. 4 is a diagram illustrating an example of a control region set (CORESET) in which a downlink control channel is transmitted in a 5G wireless communication system.

Referring to FIG. 4, a UE BWP 410 may be configured on a frequency axis, and two control resource sets (control resource set #1 401 and control resource set #2 402) are configured in one slot 420 on a time axis. The control resource set #1 401 and the control resource set #2 402 may be configured to a specific frequency resource 403 within the entire UE BWP 410 on the frequency axis. One or more OFDM symbols may be configured on the time axis and may be defined as a control resource set duration 404. In the example of FIG. 4, the control resource set #1 401 is configured with the control resource set duration of two symbols, and the control resource set #2 402 is configured with the control resource set duration of one symbol.

The base station may configure the control resource set of the 5G wireless communication system to the UE through higher layer signaling (e.g., system information (SI), master information block (MIB), and radio resource control (RRC) signaling). Configuring the control resource set to the terminal may mean providing information such as a control resource set identity, a frequency location of the control resource set, a symbol duration of the control resource set, and the like. For example, the information related to the control resource set may include information as shown in Table 5 below.

TABLE 5

```
ControlResourceSet ::=            SEQUENCE {
    -- Corresponds to L1 parameter 'CORESET-ID'
    controlResourceSetId          ,
    (Control resource set identity)
    frequencyDomainResources      BIT STRING (SIZE (45)),
```

TABLE 5-continued

```
(Frequency domain resource assignment information)
    duration                       INTEGER (1..maxCoReSetDuration),
(Time domain resource assignment information)
    cce-REG-MappingType            CHOICE {
(CCE-to-REG mapping scheme)
        interleaved                SEQUENCE{
            reg-BundleSize         ENUMERATED {n2, n3, n6},
(REG bundle size)
            precoderGranularity    ENUMERATED   {sameAsREG-
        bundle, allContiguousRBs},
            interleaverSize        ENUMERATED {n2, n3, n6}
            (Interleaver size)
            shiftIndex
            INTEGER(0.. maxNrofPhysicalResourceBlocks-1)
            (Interleaver shift)
    },
    nonInterleaved                 NULL
    },
    tci-StatesPDCCH                SEQUENCE(SIZE
    (1..maxNrofTCI-StatesPDCCH)) OF TCI-StateId       OPTIONAL,
    (QCL(Quasi Co-Location) configuration information)
    tci-PresentInDCI
                        ENUMERATED{enabled}
}
```

In Table 5, tci-StatesPDCCH (simply referred to as transmission configuration indication (TCI) state) configuration information may include information about one or more synchronization signal (SS)/physical broadcast channel (PBCH) block indices having a quasi-co-located (QCLed) relationship with a demodulation reference signal (DMRS) transmitted in the corresponding control resource set or a channel state information reference signal (CSI-RS) index. frequencyDomainResources configuration information may configure the frequency resource of the CORESET as a bitmap. Each bit may refer to a group of six PRBs that do not overlap each other. The first group may refer to a group of six PRBs having $6 \cdot \lceil N_{BWP}^{start}/6 \rceil$ as the first PRB index, wherein $N_{BWP}^{start}$ may refer to the start point of the BWP. The most significant bit of the bitmap may indicate the first group and may be configured in ascending order.

Figure 5:
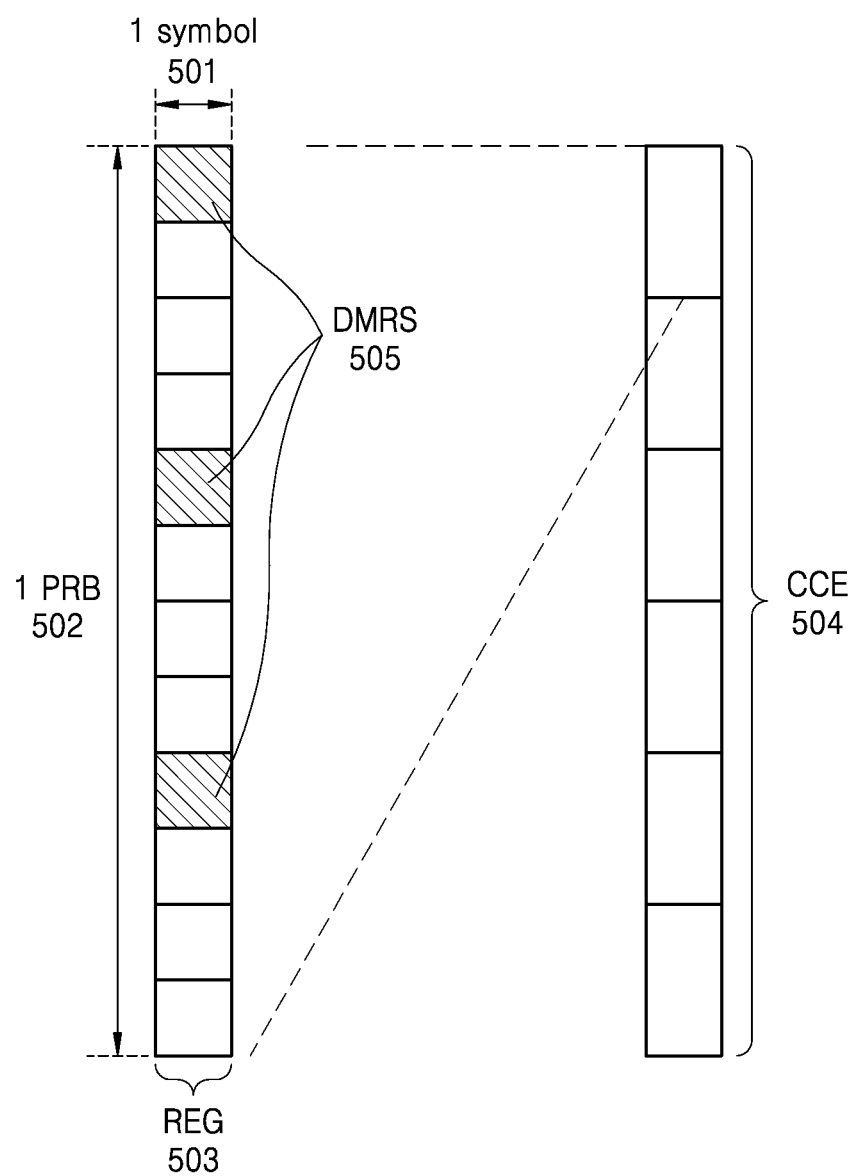
FIG. 5 is a diagram illustrating a structure of a downlink control channel in an NR system according to an embodiment of the disclosure.

FIG. 5 is a diagram illustrating a structure of a downlink control channel in an NR system according to an embodiment of the disclosure. That is, FIG. 5 is a diagram illustrating an example of a basic unit of time and frequency resources constituting a downlink control channel that is usable in a 5G communication system.

Referring to FIG. 5, the basic unit of time and frequency resources constituting the control channel may be referred to as a resource element group (REG) 503. The REG 503 may be defined as one OFDM symbol 501 in the time axis, and one physical resource block (PRB) 502, that is, 12 subcarriers, in the frequency axis. By concatenating the REG 503, a downlink control channel assignment unit may be configured.

As illustrated in FIG. 5, when the basic unit to which the downlink control channel is assigned in the 5G communication system is a control channel element (CCE) 504, one CCE 504 may include a plurality of REGs 503. In the example illustrated in FIG. 5, when the REG 503 includes 12 REs and one CCE 504 includes 6 REGs 503, one CCE 504 may include 72 REs. According to an embodiment of the disclosure, when the downlink control resource set is configured, the downlink control resource set may include a plurality of CCEs 504. A specific downlink control channel may be transmitted after being mapped to one or more CCEs 504 according to an aggregation level (AL) in the control resource set. The CCEs 504 in the control resource set may be identified by numbers. In this case, the numbers may be assigned to the CCEs 504 according to a logical mapping scheme.

The basic unit of the downlink control channel illustrated in FIG. 5, that is, the REG 503, may include both of REs to which the DCI is mapped and regions to which a DMRS 505, which is a reference signal for decoding the DCI, is mapped. As illustrated in FIG. 5, three DMRSs 505 may be transmitted in one REG 503.

The number of CCEs required to transmit the PDCCH may be 1, 2, 4, 8, or 16 according to the AL, and a different number of CCEs may be used to implement link adaptation of the downlink control channel. For example, when AL=L, one downlink control channel may be transmitted through L CCEs. The terminal has to detect a signal without knowing information about the downlink control channel. A search space representing a set of CCEs may be used to help such blind decoding. The search space may refer to a set of downlink control channel candidates including CCEs to which the terminal has to attempt decoding on a given AL. Because there are various ALs that make 1, 2, 4, 8, and 16 CCEs into one bundle, the terminal may have a plurality of search spaces. The search space set may be defined as a set of search spaces at all set ALs.

The search space may be classified into a common search space and a UE-specific search space. A certain group of terminals or all the terminals may search the common search space of the PDCCH in order to receive common control information such as a paging message or dynamic scheduling for system information. For example, the terminal may receive PDSCH scheduling allocation information for transmission of SIB including cell operator information and the like by searching the common search space of the PDCCH. The common search space may be defined as a set of previously appointed CCEs because a certain group of terminals or all the terminals have to receive the PDCCH. The terminal may receive the UE-specific PDSCH or PUSCH scheduling allocation information by monitoring the UE-specific search space of the PDCCH. The UE-specific search space may be a function of the terminal identity and various system parameters, and may be defined in a UE-specific manner.

In the 5G communication system, a parameter for the search space of the PDCCH may be set from the base station to the terminal by higher layer signaling (e.g., SIB, MIB, MAC-CE, or RRC signaling). For example, the base station may set, to the terminal, the number of PDCCH candidates at each AL L, a monitoring cycle for the search space, monitoring occasion of symbol units in the slot for the search space, a search space type (common search space or UE-specific search space), a combination of RNTI and DCI format to monitor in the search space, a control resource set index for monitoring the search space, etc. For example, the parameters for the search space may include information shown in Table 6 below.

common search space or the UE-specific search space. For example, search space set #1 and search space set #2 may be configured as the common search space, and search space set #3 and search space set #4 may be configured as the UE-specific search space.

A combination of the following DCI format and RNTI may be monitored in the common search space.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI

TABLE 6

```
SearchSpace ::=                    SEQUENCE {
  -- Identity of the search space. SearchSpaceId = 0 identifies the SearchSpace
     configured via PBCH (MIB) or ServingCellConfigCommon.
  searchSpaceId                    SearchSpaceId,
(Search space identity)
  controlResourceSetId             ControlResourceSetId,
(Control resource set identity)
  monitoringSlotPeriodicityAndOffset   CHOICE {
(Monitoring slot level periodicity)
    sl1                            NULL,
    sl2                            INTEGER (0..1),
    sl4                            INTEGER (0..3),
    sl5                            INTEGER (0..4),
    sl8                            INTEGER (0..7),
    sl10                           INTEGER (0..9),
    sl16                           INTEGER (0..15),
    sl20                           INTEGER (0..19),
  }
  monitoringSymbolsWithinSlot      BIT STRING (SIZE (14))
(Monitoring symbols within slot)
  nrofCandidates                   SEQUENCE {
(Number of PDCCH candidates for each aggregation level)
    aggregationLevel1              ENUMERATED {n0, n1, n2, n3,
    n4, n5, n6, n8},
    aggregationLevel2              ENUMERATED {n0, n1, n2, n3,
    n4, n5, n6, n8},
    aggregationLevel4              ENUMERATED {n0, n1, n2, n3,
    n4, n5, n6, n8},
    aggregationLevel8              ENUMERATED {n0, n1, n2, n3,
    n4, n5, n6, n8},
    aggregationLevel16             ENUMERATED {n0, n1, n2, n3,
    n4, n5, n6, n8}
  },
  searchSpaceType                  CHOICE {
(Search space type)
    -- Configures this search space as common search space (CSS) and DCI
    formats to monitor.
    common                         SEQUENCE {
(Common search space)
  }
    ue-Specific                    SEQUENCE {
(UE-specific search space)
    -- Indicates whether the UE monitors in this USS for DCI formats 0-0 and
    1-0 or for formats 0-1 and 1-1.
      formats                      ENUMERATED {formats0-0-
    And-1-0, formats0-l-And-1-1},
    ...
  }
}
```

The base station may configure one or more search space sets to the terminal according to configuration information described in Table 6. For example, the base station may configure the search space set #1 and the search space set #2 to the terminal, may configure DCI format A scrambled by X-RNTI in the search space set #1 to be monitored in the common search space, and may configure DCI format B scrambled by Y-RNTI in the search space set #2 to be monitored in the UE-specific search space.

According to the configuration information described in Table 6, one or more search space sets may exist in the DCI format 2_2 with CRC scrambled by TPC-PUSCH-RNTI, TPC-PUCCH-RNTI DCI format 2_3 with CRC scrambled by TPC-SRS-RNTI A combination of the following DCI format and RNTI may be monitored in the UE-specific search space.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

C-RNTI (Cell RNTI): For UE-specific PDSCH scheduling

TC-RNTI (Temporary Cell RNTI): For UE-specific PDSCH scheduling

CS-RNTI (Configured Scheduling RNTI): For semi-statically configured UE-specific PDSCH scheduling RA-RNTI (Random Access RNTI): For PDSCH scheduling in the random access phase P-RNTI (Paging RNTI): For PDSCH scheduling for transmitting paging SI-RNTI (System Information RNTI): For PDSCH scheduling for transmitting system information INT-RNTI (Interruption RNTI): For notifying whether PDSCH is punctured TPC-PUSCH-RNTI (Transmit Power Control for PUSCH RNTI): For indicating power control command for PUSCH TPC-PUCCH-RNTI (Transmit Power Control for PUCCH RNTI): For indicating power control command for PUCCH TPC-SRS-RNTI (Transmit Power Control for SRS RNTI): For indicating power control command for SRS Hereinafter, a method of assigning a frequency domain resource for a data channel in a 5G communication system will be described.

In the 5G communication system, three types may be supported as a method of indicating frequency domain resource assignment information for a downlink data channel (PDSCH) and an uplink data channel (PUSCH). For example, the three types may include resource allocation type 0, resource allocation type 1, and resource allocation type 2.

Resource allocation type 0
RB allocation information may be notified from the base station to the terminal in the form of a bitmap for a resource block group (RBG). At this time, the RBG may include a set of consecutive VRBs, and the size P of the RBG may be determined based on a value set as a higher layer parameter (rbg-Size) and a BWP size value defined in Table 7 below.

TABLE 7

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number $N_{RBG}$ of RBGs of the BWP i with the size of $N_{BWP,i}^{size}$ may be defined as follows.

$N_{RBG} = \lceil (N_{BWP,i}^{size} + (N_{BWP,i}^{start} \bmod P))/P \rceil$, where the size of the first RBG is $RBG_0^{size} = P - N_{BWP,i}^{start} \bmod P$,
the size of last RBG is $RGB_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise,
the size of all other RBGs is P.

At this time, each bit of the bitmap with the size of $N_{RBG}$ bits may correspond to each RBG. RBGs may be indexed in the order of increasing frequency, starting from the lowest frequency position of the BWP. For $N_{RBG}$ RBGs in the BWP, RBG #0 to RBG #($N_{RBG}$−1) may be mapped from the most significant bit (MSB) to the least significant bit (LSB) of the RBG bitmap. When a specific bit value in the bitmap is 1, the terminal may determine that the RBG corresponding to the bit value is allocated, and when a specific bit value in the bitmap is 0, the terminal may determine that the RBG corresponding to the bit value is not allocated.

Resource allocation type 1
RB allocation information may be notified from the base station to the terminal as information about the start position and length of the consecutively allocated VRBs. In this case, interleaving or non-interleaving may be additionally applied to the consecutively allocated VRBs. The resource allocation field of resource allocation type 1 may include a resource indication value (RIV), and the RIV may include the start point ($RB_{start}$) of the VRB and the length ($L_{RBs}$) of the consecutively allocated RB. More specifically, the RIV in the BWP with the size of $N_{BWP}^{size}$ may be defined as follows.

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs} + 1) + (N_{BWP}^{size} - 1 - RB_{start})$ where $L_{RBs} \geq 1$ and shall not exceed $N_{BWP}^{size} - RB_{start}$.

Resource allocation type 2
RB allocation information may be notified from the base station to the terminal as a set of M interlace indices. The interlace index $m \in \{0, 1, \ldots, M-1\}$ may include common RBs RB $\{m, M+m, 2M+m, 3M+m, \ldots\}$, and M may be defined as shown in Table 8.

TABLE 8

| μ | M |
|---|---|
| 0 | 10 |
| 1 | 5 |

A relationship between the common RB $n_{IRB,m}^{\mu} \in \{0, 1, \ldots\}$ and the RB $n_{CRB}^{\mu}$ in the interlace m and the bandwidth part i may be defined as follows.

$n_{CRB}^{\mu} = M n_{IRB,m}^{\mu} + N_{BWP,i}^{start,\mu} + ((m - N_{BWP,i}^{start,\mu}) \bmod M)$ where $N_{BWP,i}^{start,\mu}$ is the common resource block where bandwidth part starts relative to common resource block 0. μ is subcarrier spacing index When the subcarrier spacing is 15 kHz (μ=0), RB allocation information for the interlace set may be notified from the base station to the terminal by $m_0$+1 indices. Also, the resource allocation field may include an RIV. When the RIV is 0≤RIV<M(M+1)/2, l=0, 1, ... L−1, the number of interlaces consecutive to the start interlace $m_0$ may be L (L≥1) and the value is as follows.

if $(L-1) \leq \lfloor M/2 \rfloor$ then
RIV=M(L−1)+$m_0$
else
RIV=M(M−L+1)+(M−1−$m_0$)

When the RIV is, RIV≥M(M+1)/2 the RIV may include the start interlace index $m_0$ and l values, and may be configured as shown in Table 9.

TABLE 9

| RIV − M(M + 1)/2 | $m_0$ | l |
|---|---|---|
| 0 | 0 | {0, 5} |
| 1 | 0 | {0, 1, 5, 6} |

TABLE 9-continued

| RIV − M(M + 1)/2 | $m_0$ | l |
|---|---|---|
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When the subcarrier spacing is 30 kHz (µ=1), RB allocation information may be notified from the base station to the terminal in the form of a bitmap indicating the interlaces allocated to the terminal. The size of the bitmap is M, and 1 bit of the bitmap corresponds to an interlace. The order of the interlaced bitmap may be mapped from MSB to LSB, that is, from interlace index 0 to interlace index M−1.

In the 5G system, the base station may schedule multiple PUSCH transmissions to the terminal in one piece of DCI (e.g., DCI format 1_0). In this case, the base station may configure the time domain resource assignment information for the uplink data channel (PUSCH) through higher layer signaling (e.g., RRC signaling) using a table. Each column of the table may indicate an offset value for the transmission of the first PUSCH among multiple PUSCHs, and time resource assignment information (e.g., a start and length indicator value (SLIV) and a mapping type) for up to eight PUSCHs. The maximum number of PUSCHs to be scheduled is the number of PUSCHs included in a table configured with a higher layer configuration, and the base station may notify the terminal of the maximum number of PUSCHs. When the base station instructs the terminal to transmit multiple PUSCHs, the base station may assign only the HARQ process number for the first PUSCH to the terminal, and the terminal may determine that the HARQ process number for the second PUSCH increases by 1 in ascending order from the HARQ process number of the first PUSCH. Alternatively, when the base station passes the maximum HARQ process number to the terminal, the terminal may determine the HARQ process number through a modulo operation. Also, in this case, a size of a new data indicator (NDI) field included in the DCI may be extended from 1 bit to the maximum number (up to 8 bits) of PUSCH transmissions configured to the terminal by the base station, and each bit may be used as an NDI of each PUSCH. Also, a size of a redundancy version (RV) indicator field included in the DCI may be extended to the maximum number (up to 8 bits) of PUSCH transmissions configured to the terminal by the base station. In this case, each 1 bit may be used as an RV indicator of each PUSCH, and each 1 bit may represent a value of 0, 2, or 3.

In an NR communication system, in order to provide various services and support a high data rate, an uplink signal (configured grant PUSCH (CG-PUSCH)) may be transmitted without uplink scheduling information. In this case, the method of transmitting the uplink signal without uplink scheduling information may refer to a grant-free uplink signal (e.g., PUSCH) transmission method.

More specifically, when intending to transmit the uplink signal without uplink scheduling information, information such as resource assignment and MCS for uplink transmission may be configured through RRC signaling or DCI of the PDCCH, and the uplink transmission that may be performed by the terminal may be described based on at least the following types according to an uplink transmission configuration receiving method.

Type 1: Uplink transmission configuration using RRC signaling

Type 2: Uplink transmission configuration using downlink control channel of physical layer In Type 1, the base station may configure a specific time/frequency resource allowing grant-free PUSCH (e.g., CG-PUSCH) transmission to the terminal through higher layer signaling, for example, RRC signaling. Also, the base station may configure various parameters for PUSCH transmission (e.g., frequency hopping, DMRS configuration, MCS table, MCS, RBG size, repeated transmission count, RV, etc.) to the terminal through higher layer signaling. When configuration information for Type 1 PUSCH transmission is received from the base station, the terminal may periodically transmit the PUSCH on configured resources without the grant of the base station. Various parameters required to transmit the PUSCH (e.g., frequency hopping, DMRS configuration, MCS, RBG size, repeated transmission count, RV, number of precoding layers, antenna port, frequency hopping offset, etc.) may follow set values notified by the base station.

In Type 2, the base station may configure some pieces of information (e.g., period information) among pieces of information about a specific time/frequency resource allowing grant-free PUSCH (e.g., CG-PUSCH) transmission to the terminal through higher layer signaling (e.g., RRC signaling). Also, the base station may configure various parameters for PUSCH transmission (e.g., frequency hopping, DMRS configuration, MCS table, MCS, RBG size, repeated transmission count, RV, etc.) to the terminal through higher layer signaling.

According to an embodiment of the disclosure, the base station may transmit, to the terminal, a DCI (validation DCI) configured with a specific DCI field for the purpose of activating or releasing Type 2 CG-PUSCH scheduling. More specifically, the base station may configure the CS-RNTI to the terminal, and the terminal may monitor a DCI format in which a CRC is scrambled by CS-RNTI. When the CRC of the DCI format received by the terminal is scrambled by the CS-RNTI and the value of the NDI included in the DCI is 0, the terminal may validate that the DCI is a DCI (validation DCI) for activating or releasing Type 2 CG-PUSCH scheduling.

When the validation of Type 2 CG-PUSCH transmission is completed, the terminal may determine whether Type 2 CG-PUSCH transmission is activated or released, based on a specific field value of the DCI. For example, when the specific field has a value shown in Table 10 below according to the DCI format, the terminal may determine that Type 2 CG-PUSCH is activated. For another example, when the specific field has a value shown in Table 11 below according to the DCI format, the terminal may determine that Type 2 CG-PUSCH is released.

TABLE 10

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 11

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

That is, referring to Table 10, for DCI format 0_0 or 0_1, when the HARQ process number value is all '0's and the RV value is '00', the terminal may determine that Type 2 CG-PUSCH transmission is activated. Also, for DCI format 1_0, when the HARQ process number value is all '0's and the RV value is '00', the terminal may determine that Type 2 CG-PUSCH transmission is activated. Also, for DCI format 1_0, when the HARQ process number value is all '0's and the RV value is '00' for an enabled transport block, the terminal may determine that Type 2 CG-PUSCH transmission is activated.

Also, referring to Table 11, for DCI format 0_0, when the HARQ process number value is all '0's, the RV value is '00', an MCS value is all '1's, and an FDRA value is all '1's, the terminal may determine that Type 2 CG-PUSCH transmission is released. Also, for DCI format 1_0, when the HARQ process number value is all '0's, the RV value is '00', an MCS value is all '1's, and an FDRA value is all '1's, the terminal may determine that Type 2 CG-PUSCH transmission is released.

Figure 6:
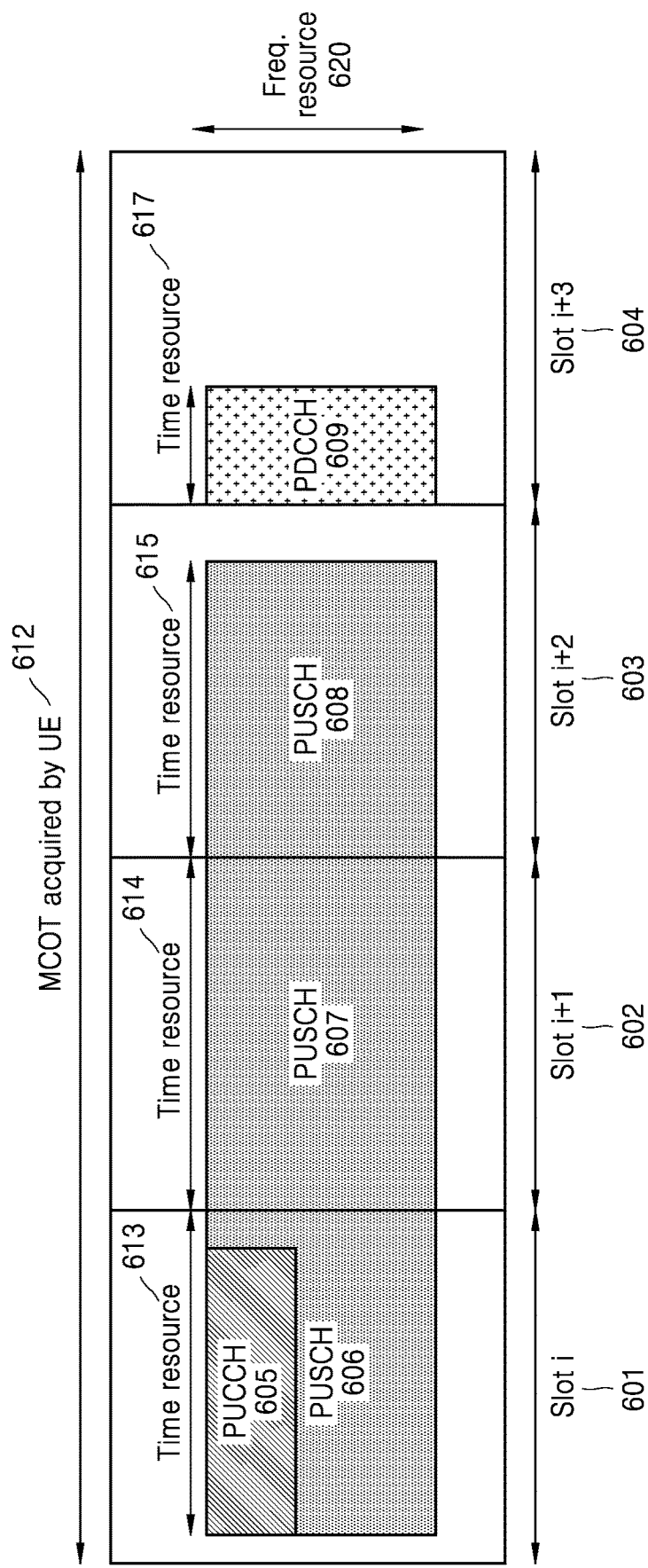
FIG. 6 is a diagram illustrating an example of transmitting an uplink signal without uplink scheduling information in an NR system according to an embodiment of the disclosure.

FIG. 6 is a diagram illustrating an example of transmitting an uplink signal without uplink scheduling information in an NR system according to an embodiment of the disclosure. That is, FIG. 6 is a diagram illustrating a case in which an uplink signal is transmitted in an unlicensed spectrum without uplink scheduling information.

Referring to FIG. 6, slot i 601, slot i+1 602, slot i+2 603, and slot i+3 604 may be included within a maximum channel occupancy time (MCOT) 612 of a terminal. Transmission of a PUCCH 605 and a PUSCH 606 on a time resource 613 for slot i 601 may be scheduled. Also, transmission of a PUSCH 607 on a time resource 614 for slot i+1 602 may be scheduled. Also, transmission of a PUSCH 608 on a time resource 615 for slot i+2 603 may be scheduled. Also, transmission of a PDCCH 609 on a time resource 617 for slot i+3 604 may be scheduled. The time resource 613, the time resource 614, the time resource 615, and the time resource 617 may correspond to frequency resources 620, respectively.

In an unlicensed spectrum, a channel access procedure may be performed so as to transmit an uplink signal without uplink scheduling information. In this case, when the terminal accesses the unlicensed spectrum by performing the channel access procedure for a variable time, the terminal may schedule downlink transmission in the last slot or the last subframe (e.g., slot i+3 604) within the MCOT 612 based on a channel occupancy time sharing indicator of uplink control information (e.g., PUCCH 605). In this case, the base station may determine channel access by performing a channel access procedure for a fixed time. The terminal may configure the last symbol of the slot or subframe (e.g., slot i+2 603) for uplink transmission as a gap interval vacated for the channel access procedure of the base station. When transmitting the CG-PUSCH in the unlicensed spectrum, the terminal may transmit CG uplink control information (UCI) including HARQ ID, RV, and CG-PUSCH scheduling information of the CG-PUSCH in a state of being included in the CG-PUSCH. In this case, all CG-PUSCHs may include at least one CG-UCI.

The disclosure relates to a wireless communication system, and more particularly, to a method and apparatus for transmitting and receiving DCI in a wireless communication system. More specifically, the disclosure relates to a wireless communication system, and more particularly, to a method of determining and analyzing control information included in DCI in a system and a node for transmitting an uplink signal through an unlicensed spectrum, or a system and node for receiving a downlink signal through an unlicensed spectrum.

Also, the disclosure relates to a method and apparatus for transmitting and receiving a downlink control channel in a wireless communication system. In an embodiment of the disclosure, a method of determining DCI included in a downlink control channel in a system and a node for transmitting an uplink signal through an unlicensed spectrum or a system and a node for receiving a downlink signal through an unlicensed spectrum.

According to an embodiment of the disclosure, uplink data transmission efficiency may be improved through the method of determining control information included in the downlink control channel in the system and the node for receiving the downlink signal or the system and the node for transmitting the uplink signal in the wireless communication system.

The disclosure describes a method, performed by a terminal, of receiving DCI in a base station and the terminal configured to receive or transmit a downlink signal or an uplink signal in an unlicensed spectrum. More specifically, the terminal may determine activation or deactivation of CG-PUSCH transmission based on information configured from the base station through L1 or higher layer signaling (e.g., SIB, MIB, MAC-CE, or RRC signaling).

A method and apparatus described in embodiments of the disclosure are not applied to each embodiment on a limited basis, and may be utilized in a method and apparatus for transmitting or controlling uplink control information using all or a combination of one or more embodiments of the disclosure described herein. Also, in an embodiment of the disclosure, a case in which the terminal receives the configuration of PUSCH transmission or PDSCH reception from the base station through higher layer signal configuration without DCI reception and perform the PUSCH transmission or the PDSCH reception, as in semi-persistent scheduling (SPS) or configured grant transmission, will be described as an example, but the disclosure may also be applied to a case in which the terminal is scheduled to receive a PDSCH or transmit a PUSCH from the base station through DCI. In addition, the disclosure may also be applied to the case of transmitting uplink control information in a broadband system such as subband-based broadband unlicensed spectrum, multi carrier, or carrier aggregation transmission. In addition, an embodiment of the disclosure will be described on the assumption of a base station and a terminal operating in an unlicensed spectrum, but a method and apparatus described in an embodiment of the disclosure may be applied to a base station and a terminal operating in a licensed spectrum, shared spectrum, or sidelink.

Embodiment 1

The embodiment of the disclosure describes a method, performed by the terminal, of determining control information included in a downlink control channel when the base station and the terminal operating in the unlicensed spectrum are present. More specifically, embodiment 1 of the disclosure describes a method and apparatus for determining activation or release of Type 2 CG-PUSCH using a specific field among pieces of control information included in a control channel received from a base station by a terminal.

According to an embodiment of the disclosure, when the base station and the terminal that transmit and receive signals in an unlicensed spectrum are present, it may be assumed that the terminal is configured to perform PUCCH/PUSCH transmission in at least one slot with configured grant. Also, the terminal may be indicated or configured with an interlace-based uplink (or downlink) frequency domain resource assignment (or frequency domain resource allocation type 2) method through L1 or higher layer signaling (e.g., SIB, MIB, MAC-CE, or RRC signaling) from the base station. Also, the terminal may be indicated or configured with a subcarrier spacing for uplink (or downlink) transmission from the base station through L1 or higher layer signaling. The base station may transmit, to the terminal, a DCI (e.g., validation DCI) in which specific DCI fields are configured with specific values for the purpose of activating or releasing the above-described Type 2 CG-PUSCH scheduling. In this case, the DCI may include DCI formats 0_0, 0_1, and 0_2. When the specific DCI fields included in the received DCI indicate specific values, the terminal may determine that Type 2 CG-PUSCH scheduling is activated or released. Hereinafter, when the terminal according to embodiment 1 of the disclosure receives a DCI including a specific field from the base station, a method of determining and interpreting the DCI will be described in detail.

Method 1

According to an embodiment of the disclosure, the base station may configure a specific DCI field and transmit DCI to the terminal for the purpose of activating or releasing Type 2 CG-PUSCH scheduling. In this case, the base station may include an FDRA field as a specific DCI field in DCI to be transmitted to the terminal. The base station may configure (control or change) the FDRA field value for activation or release of Type 2 CG-PUSCH scheduling, based on the subcarrier spacing information and the uplink (or downlink) frequency resource assignment method configured to the terminal through L1 or higher layer signaling. The terminal may determine whether the FDRA field value of the received DCI indicates the activation or the release of the Type 2 CG-PUSCH scheduling, based on the subcarrier spacing information and the uplink (or downlink) frequency resource assignment method indicated or configured from the base station through L1 or higher layer signaling.

For example, when the terminal is configured with 15 kHz ($\mu$=0) as the subcarrier spacing and the interlaced method (or FDRA Type 2) as the frequency resource assignment method for CG-PUSCH transmission from the base station (or when the terminal is configured with the RIV-based RB allocation indication method), the terminal may determine that the information field related to FDRA means the release of Type 2 CG-PUSCH scheduling when the terminal interprets the information field related to FDRA among specific fields of the received DCI in order to determine the scheduling release for Type 2 CG-PUSCH, or when all (or some) information fields related to FDRA are set to 1 (or 0). In an embodiment of the disclosure, the information field related to FDRA may be referred to as a frequency assignment information field.

For example, when the terminal is configured with 30k Hz ($\mu$=1) as the subcarrier spacing and the interlaced method (or FDRA Type 2) as the frequency resource assignment method for CG-PUSCH transmission from the base station (or when the terminal is configured with the bitmap-based RB allocation indication method), the terminal may determine that the information field related to FDRA means the release of Type 2 CG-PUSCH scheduling when the terminal interprets the information field related to FDRA among specific fields of the received DCI in order to determine the scheduling release for Type 2 CG-PUSCH, or when all (or some) information fields related to FDRA are set to 0 (or 1).

The above-described method is not limited to the subcarrier spacing information configured from the base station by the terminal, and may be extended to an RB allocation indication method. For example, in the case in which the subcarrier spacing is X kHz (e.g., X=60, 120, 240, 480, 960) and the RB allocation indication method of FDRA Type 2 is based on a bitmap, the terminal may determine that the information field related to FDRA means the release of Type 2 CG-PUSCH scheduling when all (or some) information fields related to FDRA are set to 0 (or 1). For example, in the case in which the RB allocation indication method of FDRA Type 2 is based on an RIV, the terminal may determine that the information field related to FDRA means the release of Type 2 CG-PUSCH scheduling when all (or some) information fields related to FDRA are set to 1 (or 0).

Using Method 1 described above, the terminal may determine whether the FDRA field value of the received DCI indicates activation or release of Type 2 CG-PUSCH scheduling, based on the subcarrier spacing information and the uplink (or downlink) frequency resource assignment method indicated or configured from the base station through L1 or higher layer signaling. That is, the terminal may determine the activation or the release of the Type 2 CG-PUSCH scheduling differently, even when the FDRA field values of the received DCI are the same, based on the frequency resource assignment method, the subcarrier spacing information, and the like.

Method 2

According to an embodiment of the disclosure, when a specific DCI format (e.g., DCI format 1_0) is used for activation or release of Type 2 CG-PUSCH scheduling, the terminal may determine that only some bits of the frequency allocation information field are used for determining the activation or the release of the Type 2 CG-PUSCH scheduling when interpreting the frequency allocation information field among the specific fields of the DCI.

For example, the frequency assignment information field includes X+Y bits. X bits may refer to an allocated interlace index of Type 2 FDRA (e.g., based on a bitmap or RIV), and Y bits may refer to an RB region activated within a specific frequency domain (e.g., a BWP). In this case, the terminal may determine whether to release Type 2 CG-PUSCH based on the X bits. Alternatively, the terminal may determine whether to release Type 2 CG-PUSCH based on the Y bits. In this case, the values of X and Y may be set as a value indicating an allocated interlace index of Type 2 FDRA and a value indicating an RB region activated within a specific frequency domain.

Method 3

According to an embodiment of the disclosure, when the frequency assignment information field of the received DCI is used for activation or release of Type 2 CG-PUSCH scheduling and there is an unused bit or reserved bit among the frequency assignment information field values, the terminal may determine that scheduling for Type 2 CG-PUSCH is activated or released when the corresponding bit or the index indicating the corresponding value is received.

For example, in the case in which the terminal is configured with the interlace-based frequency domain assignment (or FDRA Type 2) from the base station through L1 or higher layer signaling and 15 kHz (μ=1) is set (or RIV-based RB allocation indication method) as the subcarrier spacing, when the frequency assignment information field of the received DCI is used for scheduling release for Type 2 CG-PUSCH, the terminal may determine that scheduling for Type 2 CG-PUSCH is released when receiving a field set as an unused or reserved bit among the RIV fields.

Embodiment 2

The embodiment of the disclosure describes a method, performed by the terminal, of determining control information included in a downlink control channel when the base station and the terminal operating in the unlicensed spectrum are present. More specifically, embodiment 2 of the disclosure describes a method and apparatus for determining activation or release of Type 2 CG-PUSCH using a specific field among pieces of control information included in a control channel received from a base station by a terminal.

According to an embodiment of the disclosure, when the base station and the terminal that transmit and receive signals in an unlicensed spectrum are present, it may be assumed that the terminal is configured to perform PUCCH/PUSCH transmission in at least one slot with configured grant. Also, the terminal may be scheduled to transmit multiple PUSCHs as one piece of DCI through L1 or higher layer signaling from the base station. Also, the terminal may receive at least one higher layer configuration for CG-PUSCH transmission from the base station, and the base station may activate at least one of the multiple CG-PUSCH transmission configurations configured to the terminal through a Type 2 CG-PUSCH scheduling activation method.

According to an embodiment of the disclosure, the base station may transmit DCI including a specific DCI field to the terminal for the purpose of activating or releasing the Type 2 CG-PUSCH scheduling. Hereinafter, a method, performed by the terminal according to embodiment 2 of the disclosure, of determining and interpreting DCI including a specific field will be described in detail.

Embodiment 2-1

In the case in which the terminal receives DCI (e.g., DCI format 0_1) indicating activation of Type 2 CG-PUSCH transmission from the base station, when the DCI is used for multiple PUSCH scheduling, the terminal may determine that only information corresponding to a specific PUSCH (e.g., the first PUSCH) among values set for multiple PUSCH scheduling in the fields of the DCI is valid. This example is illustrated in FIG. 7.

Figure 7:
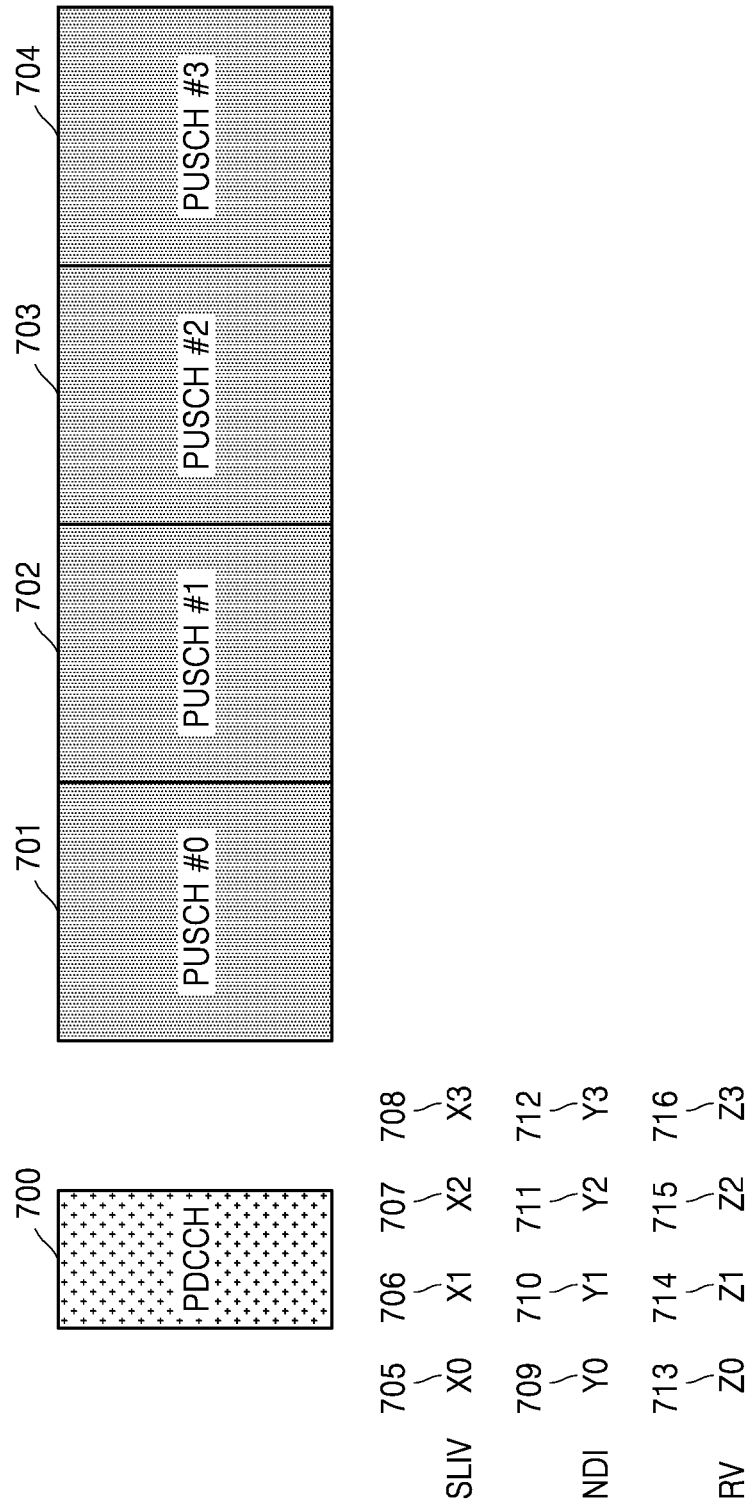
FIG. 7 is a diagram illustrating an example of a method of identifying a field of downlink control information (DCI) when multiple physical uplink shared channel (PUSCH) scheduling is used according to an embodiment of the disclosure.

FIG. 7 is a diagram illustrating an example of a method of identifying a field of DCI when multiple PUSCH scheduling is used according to an embodiment of the disclosure.

Referring to FIG. 7, DCI that schedules four PUSCHs in FIG. 7 may be transmitted from a base station to a terminal through a PDCCH 700. Activation of Type 2 CG-PUSCH transmission may be indicated by the DCI transmitted to the terminal. In an embodiment of the disclosure, the DCI transmitted to the terminal may include time domain resource assignment information for scheduling four PUSCHs. For example, the time domain resource assignment information may include an SLIV value. In FIG. 7, the SLIV value may include X0 705, X1 706, X2 707, and X3 708. In this case, SLIV values may respectively correspond to the scheduled PUSCHs. For example, X0 705 may correspond to the first PUSCH 701 (e.g., PUSCH #0), X1 706 may correspond to the second PUSCH 702 (e.g., PUSCH #1), X2 707 may correspond to the third PUSCH 703 (e.g., PUSCH #2). X3 708 may correspond to the fourth PUSCH 704 (e.g., PUSCH #3).

In an embodiment of the disclosure, the DCI may include NDI values. For example, in FIG. 7, the NDI value may include Y0 709, Y1 710, Y2 711, and Y3 712. In this case, SLIV values may respectively correspond to the scheduled PUSCHs.

Also, in an embodiment of the disclosure, the DCI may include RV values. For example, in FIG. 7, the RV value may include Z0 713, Z1 714, Z2 715, and Z3 716. In this case, RV values may respectively correspond to the scheduled PUSCHs.

When the terminal is instructed to activate Type 2 CG-PUSCH transmission from the base station through DCI scheduling four PUSCHs, the terminal determines that only time domain resource assignment information (e.g., the SLIV value X0 705) corresponding to a specific PUSCH (e.g., first PUSCH 701) scheduling among the time domain resource assignment values indicated by the DCI is valid. Similarly, the terminal may determine that only the NDI value Y0 709 corresponding to a specific PUSCH (e.g., first PUSCH 701) among the NDI values included in the DCI is valid. That is, the terminal may determine that the NDI value Y0 709 corresponding to the specific PUSCH (e.g., the first PUSCH 701) is used for validation of DCI indicating activation of Type 2 CG-PUSCH transmission (e.g., NDI=0). Similarly, the terminal may determine that the RV value Z0 713 corresponding to the specific PUSCH (e.g., the first PUSCH 701) among the RV values included in the DCI is valid.

Meanwhile, the terminal may receive at least one higher layer configuration for Type 2 CG-PUSCH transmission from the base station. In this case, the terminal may determine that the NDI values (e.g., Y1 710, Y2 711, and Y3 712) other than the NDI value Y0 709 corresponding to the specific PUSCH (e.g., the first PUSCH 701) among the NDI values are used as a specific DCI field for determining activation of Type 2 CG-PUSCH transmission. For example, when the NDI values (e.g., Y1 710, Y2 711, and Y3 712) other than the NDI value Y0 709 corresponding to the specific PUSCH (e.g., the first PUSCH 701) among the NDI values are all 0, 1, or a specific value, the terminal may determine that the DCI indicates activation of Type 2 CG-PUSCH transmission.

Embodiment 2-2

A terminal may receive at least one higher layer configuration for Type 2 CG-PUSCH transmission from the base station. When a field (e.g., 'ChannelAccess-CPext') for providing at least one of a channel access procedure type, a CP length, timing advance, or CAPC information is included in DCI indicating activation of Type 2 CG-PUSCH transmission received from a base station to a terminal, the terminal may determine the field as a specific DCI field used to determine activation of Type 2 CG-PUSCH transmission. For example, when the fields of the received DCI indicate all 0, 1, or the specific value, the UE may determine that the corresponding DCI indicates activation of Type 2 CG-PUSCH transmission.

A method of activating or deactivating Type 2 GG-PUSCH (or DL SPS) scheduling through a combination of the above-described embodiments of the disclosure or methods may also be possible.

Figure 8:
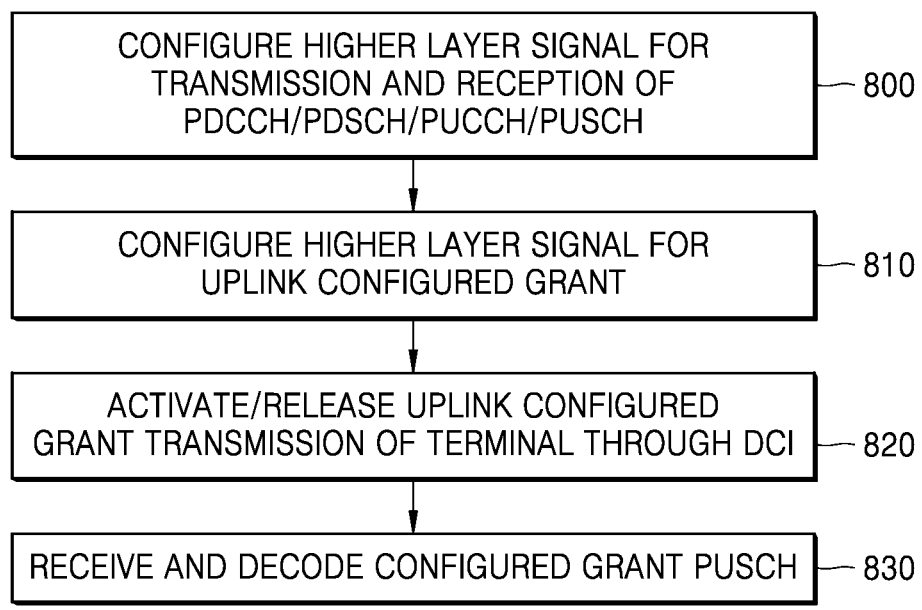
FIG. 8 is a flowchart of an operation of a base station, according to an embodiment of the disclosure.

FIG. 8 is a flowchart of an operation of a base station, according to an embodiment of the disclosure.

Referring to FIG. 8, at operation 800, a base station may configure a higher layer signal for transmission and reception of PDCCH, PDSCH, PUCCH, or PUSCH. That is, the base station may transmit a configuration related to transmission and reception of PDCCH, PDSCH, PUCCH, or PUSCH to a terminal through a higher layer signal. For example, the base station may transmit a PDCCH resource region, in which the terminal may receive downlink or uplink scheduling information, a CORESET configuration, a search space configuration, and the like, to the terminal through a higher layer signal. Also, the base station may transmit a configuration related to PDSCH/PUSCH transmission and reception to the terminal through a higher layer signal, including offset information between a PDCCH reception slot and a PDSCH reception slot, offset information between a PDCCH reception slot and a PUSCH transmission slot, PDSCH or PUSCH repeated transmission count information, and the like. Also, the base station may transmit a configuration related to configuration information for scheduling multiple PUSCHs with one piece of DCI, interlace structure configuration, and subcarrier spacing information used for downlink reception or uplink transmission to the terminal through a higher layer signal.

At operation 810, the base station may configure a higher layer signal for uplink configured grant. For example, the base station may additionally transmit, to the terminal, configured grant configuration information such as configured grant transmission period and offset information (in the signal transmitted by the base station at operation 800). Also, the base station may additionally transmit one or more pieces of configured grant configuration information to the terminal. According to an embodiment of the disclosure, the configured grant configuration information transmitted from the base station to the terminal at operation 810 may be transmitted from the base station to the terminal at operation 800. According to an embodiment of the disclosure, the configured grant configuration information may refer to grant-free configuration information.

At operation 820, the base station may activate or release uplink configured grant transmission of the terminal through DCI. That is, the base station may transmit, to the terminal, information necessary for indicating activation or release of Type 2 CG-PUSCH scheduling using DCI.

At operation 830, the base station may receive and decode a configured grant PUSCH. For example, the base station may receive a CG-PUSCH and uplink control information included in the CG-PUSCH from the terminal, based on the information configured to the terminal by the base station, and may decode uplink control information included in the CG-PUSCH.

Figure 9:
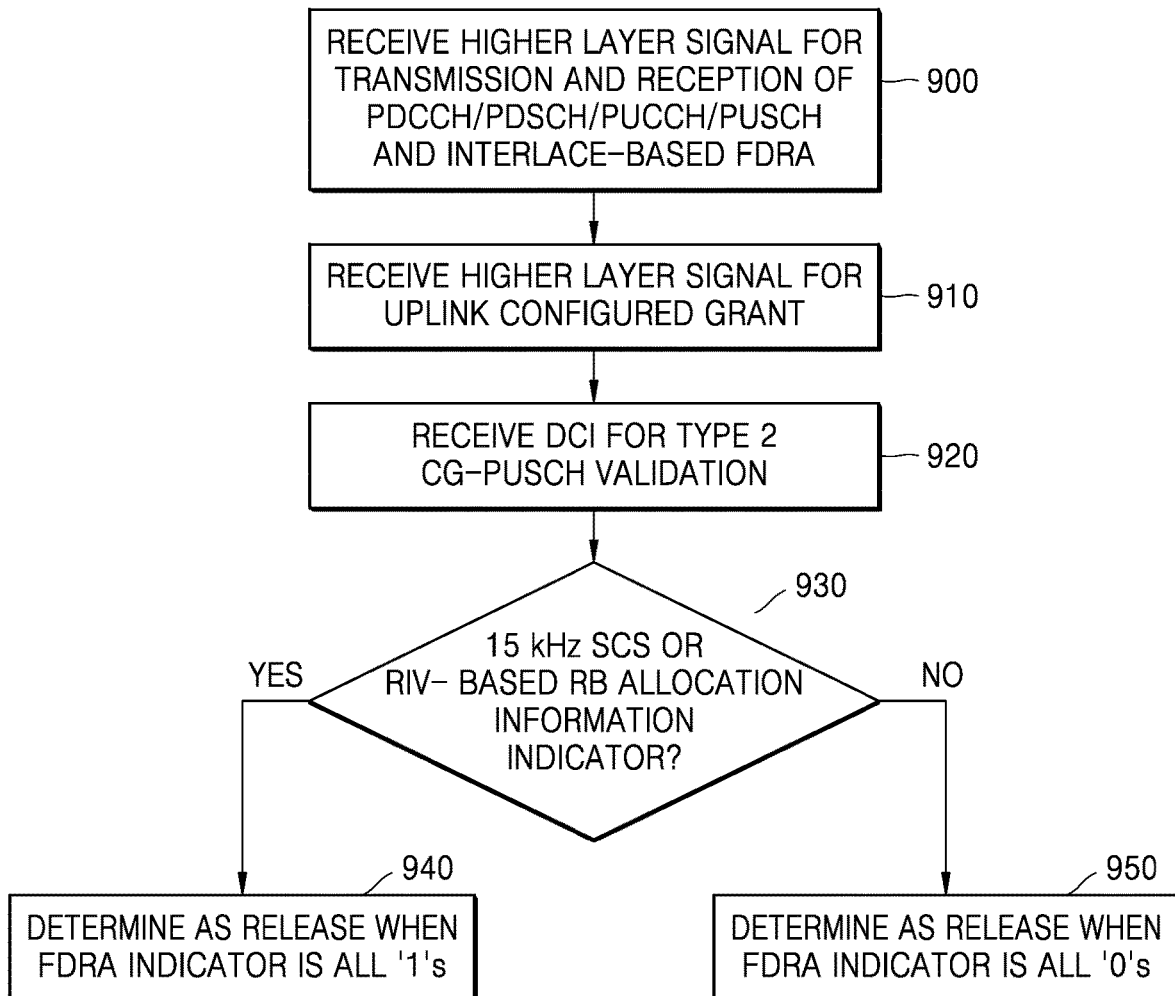
FIG. 9 is a flowchart of an operation of a terminal, according to an embodiment of the disclosure.

FIG. 9 is a flowchart of an operation of a terminal, according to an embodiment of the disclosure.

Referring to FIG. 9, at operation 900, the terminal may receive configuration information related to transmission and reception of PDCCH, PDSCH, PUCCH, or PUSCH from a base station through a higher layer signal. The configuration related to the transmission and reception of the PDCCH, PDSCH, PUCCH, or PUSCH may be performed based on the received configuration information. For example, the terminal may be configured with a PDCCH resource region, in which the terminal may receive downlink or uplink scheduling information, a CORESET configuration, a search space configuration, and the like, from the base station through a higher layer signal. Also, the terminal may be configured with a configuration related to configuration information for scheduling multiple PUSCHs with one piece of DCI, interlace structure configuration, and subcarrier spacing information used for downlink reception or uplink transmission from the base station through a higher layer signal.

At operation 910, the terminal may receive a higher layer signal for uplink configured grant. For example, the terminal may be additionally configured with configured grant configuration information such as a configured grant transmission period and offset information (in addition to the information configured from the base station at operation 900). Also, the terminal may be additionally configured with one or more pieces of configured grant configuration information from the base station. According to an embodiment of the disclosure, the configured grant configuration information that the terminal receives from the base station at operation 910 may be included in the configuration information added to the higher layer signal transmitted at operation 900 and may be transmitted to the terminal.

At operation 920, the terminal may receive DCI for Type 2 CG-PUSCH validation. For example, in order to determine the release or activation of Type 2 CG-PUSCH scheduling by receiving DCI, the terminal may receive DCI including necessary information from the base station.

At operation 930, the terminal may determine whether the subcarrier spacing to be used by the terminal is 15 kHz or whether an RIV-based RB allocation information indicator is to be used. When the terminal uses the subcarrier spacing of 15 kHz or the RB allocation information indicator used for FDRA is based on the RIV, the terminal may determine at operation 940 that the DCI releases Type 2 CG-PUSCH when the FDRA indicator is all '1's.

When the terminal does not use the subcarrier spacing of 15 kHz or the RB allocation information indicator used for FDRA is not based on the RIV, that is, when the terminal uses the subcarrier spacing of 30 kHz or the RB allocation information indicator used for FDRA is based on a bitmap, the terminal may determine at operation 950 that the DCI releases Type 2 CG-PUSCH when the FDRA indicator is all '0's.

Figure 10:
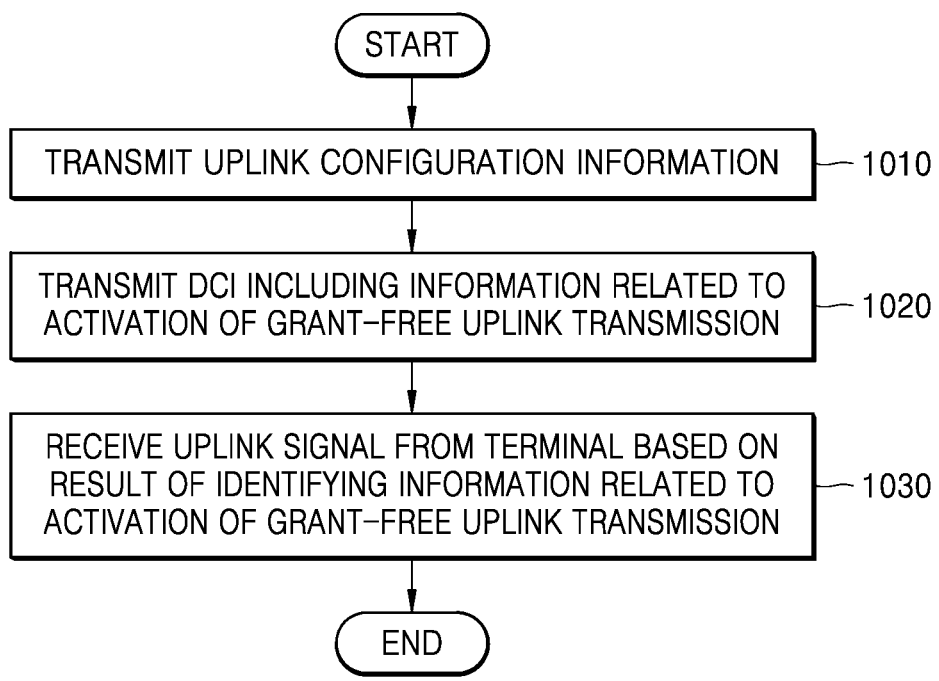
FIG. 10 is a flowchart of an operation of a base station for identifying activation of grant-free uplink transmission, according to an embodiment of the disclosure.

FIG. 10 is a flowchart of an operation of a base station for identifying activation of grant-free uplink transmission, according to an embodiment of the disclosure.

Referring to FIG. 10, at operation 1010, the base station may transmit uplink configuration information to a terminal. According to an embodiment of the disclosure, the uplink configuration information may include an uplink frequency domain resource assignment indicator or subcarrier spacing information. For example, the uplink frequency domain resource assignment indicator may include a bitmap-based indicator indicating an RB based on a bitmap, an RIV-based indicator indicating an RB based on an RIV, and the like. In an embodiment of the disclosure, the subcarrier spacing information may include a value (e.g., a μ value) representing the numerology of uplink signal transmission, a subcarrier spacing value (e.g., 15 kHz, 30 kHz, 60 kHz, 120 kHz, 240 kHz, . . . ), and the like.

At operation 1020, the base station may transmit, to the terminal, DCI including information related to activation of grant-free uplink transmission. According to an embodiment of the disclosure, the grant-free uplink transmission may refer to a method of transmitting an uplink signal without uplink scheduling information. For example, the grant-free uplink transmission may include CG-PUSCH transmission. According to an embodiment of the disclosure, the information related to activation of grant-free uplink transmission may include an information field related to frequency assignment. In an embodiment of the disclosure, the information field related to the frequency assignment may refer to an FDRA field included in DCI. In FIG. 10, operations 1010 and 1020 have been described as separate operations, but are not limited thereto. That is, operations 1010 and 1020 may be performed simultaneously or may be performed separately.

At operation 1030, the base station may receive an uplink signal from the terminal based on a result of identifying the information related to activation of grant-free uplink transmission. For example, the information related to activation of grant-free uplink transmission may be identified based on the uplink configuration information. When it is determined that the grant-free uplink transmission is activated according to the result of the identifying, the terminal may transmit an uplink signal to the base station using a grant-free uplink transmission method. However, when it is determined that the grant-free uplink transmission is released according to the result of the identifying, the terminal may release the grant-free uplink transmission. Therefore, the base station may not be able to receive an uplink signal based on a grant-free uplink from the terminal.

Figure 11:
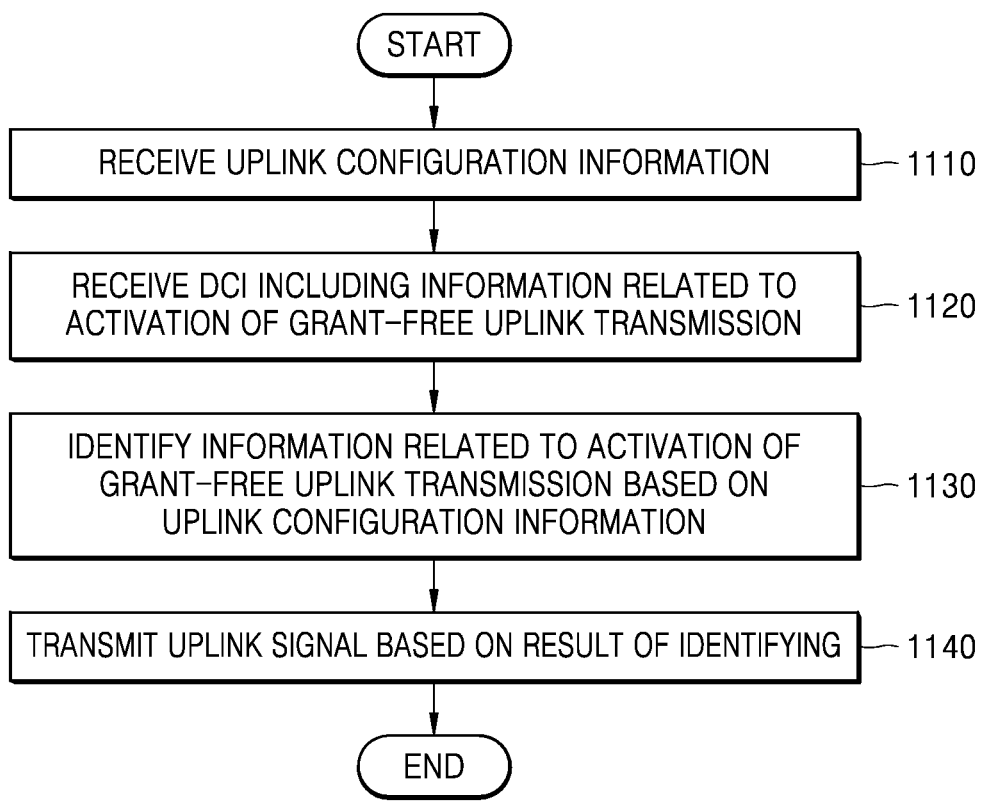
FIG. 11 is a flowchart of an operation of a terminal for identifying activation of grant-free uplink transmission, according to an embodiment of the disclosure.

FIG. 11 is a flowchart of an operation of a terminal for identifying activation of grant-free uplink transmission, according to an embodiment of the disclosure.

Referring to FIG. 11, at operation 1110, the terminal may receive uplink configuration information from a base station. According to an embodiment of the disclosure, the uplink configuration information may include an uplink frequency domain resource assignment indicator or subcarrier spacing information. For example, the uplink frequency domain resource assignment indicator may include a bitmap-based indicator indicating an RB based on a bitmap, an RIV-based indicator indicating an RB based on an RIV, and the like.

At operation 1120, the terminal may receive DCI including information related to activation of grant-free uplink transmission. According to an embodiment of the disclosure, the information related to activation of grant-free uplink transmission may include an information field related to frequency assignment. In an embodiment of the disclosure, the information field related to the frequency assignment may refer to an FDRA field included in DCI. In FIG. 11, operations 1110 and 1120 have been described as separate operations, but are not limited thereto. That is, operations 1110 and 1120 may be performed simultaneously or may be performed separately.

At operation 1130, the terminal may identify the information related to activation of grant-free uplink transmission based on the uplink configuration information. That is, the terminal may identify whether the information field related to frequency assignment indicates activation or release of grant-free uplink transmission, based on an uplink frequency domain resource assignment indicator or subcarrier spacing information.

For example, the terminal may be configured with an interlace scheme (or FDRA Type 2) from the base station as a frequency resource assignment method for CG-PUSCH transmission. When the terminal is configured with the subcarrier spacing of 15 kHz from the base station or the uplink frequency resource assignment indicator is an RIV-based indicator, the terminal may determine that the grant-free uplink (e.g., Type 2 CG-PUSCH) scheduling is released when bits of the information field related to frequency assignment (e.g., FDRA) are all '1's. That is, the terminal may stop grant-free uplink (e.g., Type 2 CG-PUSCH) transmission.

Alternatively, when the terminal is configured with the subcarrier spacing of 30 kHz from the base station or the uplink frequency resource assignment indicator is a bitmap-based indicator, the terminal may determine that the grant-free uplink (e.g., Type 2 CG-PUSCH) scheduling is released when bits of the information field related to frequency assignment (e.g., FDRA) are all '0's. That is, the terminal may stop grant-free uplink (e.g., Type 2 CG-PUSCH) transmission.

According to an embodiment of the disclosure, the terminal may identify activation or release of grant-free uplink transmission using only some bits (e.g., n bits) of the information field related to frequency assignment. In this case, the n bits may be less than the total number of bits corresponding to the information field related to frequency assignment.

According to an embodiment of the disclosure, the terminal may identify activation or release of grant-free uplink transmission based on a reserved bit of the information field related to frequency assignment.

Figure 12:
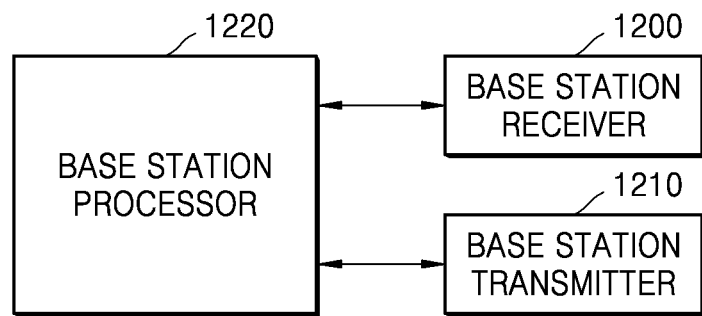
FIG. 12 is a block diagram illustrating a structure of a base station, according to an embodiment of the disclosure.
Figure 13:
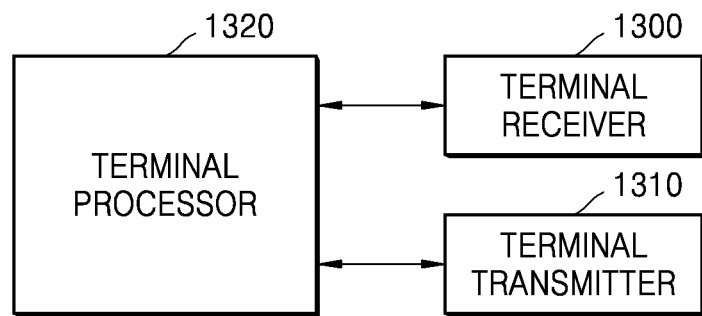
FIG. 13 is a block diagram illustrating a structure of a terminal, according to an embodiment of the disclosure.

At operation 1140, the terminal may transmit an uplink signal to the base station based on a result of the identifying. According to an embodiment of the disclosure, when the activation of grant-free uplink transmission is identified, the terminal may transmit an uplink signal to the base station using grant-free uplink transmission. Alternatively, when the release of grant-free uplink transmission is identified, the terminal may release the grant-free uplink transmission. As illustrated in FIGS. 8 to 11, the terminal or the base station may identify activation or release of grant-free uplink transmission. FIGS. 12 and 13 illustrate the internal structures of a base station and a terminal, according to various embodiments of the disclosure.

FIG. 12 is a block diagram illustrating an internal structure of a base station, according to an embodiment of the disclosure.

Referring to FIG. 12, the base station according to the embodiment of the disclosure may include a base station receiver 1200, a base station transmitter 1210, and a base station processor 1220. However, the elements of the base station are not limited to the above-described example. For example, the base station may include more or fewer elements than the aforementioned elements. In addition, the base station receiver 1200, the base station transmitter 1210, and the base station processor 1220 may be implemented in the form of a single chip.

In an embodiment of the disclosure, the base station receiver 1200 and the base station transmitter 1210 may be collectively referred to as a transceiver. The transceiver may transmit and receive a signal with the terminal. The signal may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal through a radio channel, output the received signal to the base station processor 1220, and transmit an output signal of the base station processor 1220 through the radio channel.

According to an embodiment of the disclosure, the base station processor 1220 may control a series of processes so that the base station operates according to the above-described embodiment of the disclosure. For example, the elements of the base station may be controlled to perform the method of transmitting DCI, according to the embodiment of the disclosure. For example, the base station processor

1220 may perform a channel access procedure for an unlicensed spectrum. For a specific example, the base station receiver 1200 may receive signals transmitted through the unlicensed spectrum. The base station processor 1220 may determine whether the unlicensed spectrum is in an idle state by comparing the strength of the received signal with a threshold predefined or calculated by a function having a bandwidth, etc. as a factor. For another example, the base station processor 1220 may construct or change DCI information for instructing the base station to release or activate Type 2 CG-PUSCH scheduling.

According to an embodiment of the disclosure, the base station processor 1220 may include at least one processor. The at least one processor may execute programs stored in a memory to perform the above-described DCI transmitting operation according to the embodiment of the disclosure.

Although not illustrated in FIG. 12, the base station may further include a memory. According to an embodiment of the disclosure, the memory may store programs and data required for operations of the base station. Also, the memory may store control information or data included in signals transmitted and received by the base station. The memory may be implemented as a storage medium, such as read-only memory (ROM), random access memory (RAM), hard disk, compact disc read-only memory (CD-ROM), and digital versatile disc (DVD), or a combination thereof. Also, the base station may include a plurality of memories. According to an embodiment of the disclosure, the memory may store a program for performing the above-described DCI transmitting operation according to the embodiment of the disclosure.

FIG. 13 is a block diagram illustrating an internal structure of a terminal, according to an embodiment of the disclosure.

Referring to FIG. 13, the terminal according to the embodiment of the disclosure may include a terminal receiver 1300, a terminal transmitter 1310, and a terminal processor 1320. However, the elements of the terminal are not limited to the above-described example. For example, the terminal may include more or fewer elements than the aforementioned elements. In addition, the terminal receiver 1300, the terminal transmitter 1310, and the terminal processor 1320 may be implemented in the form of a single chip.

In an embodiment of the disclosure, the terminal receiver 1300 and the terminal transmitter 1310 may be collectively referred to as a transceiver. The transceiver may transmit and receive a signal with the base station. The signal may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal through a radio channel, output the received signal to the terminal processor 1320, and transmit an output signal of the terminal processor 1320 through the radio channel.

According to an embodiment of the disclosure, the terminal processor 1320 may control a series of processes so that the terminal operates according to the above-described embodiment of the disclosure. For example, the elements of the terminal may be controlled to perform the method of receiving DCI, according to the embodiment of the disclosure.

For example, the terminal receiver 1300 may receive a data signal including a control signal. The terminal processor 1320 may determine a result of receiving the data signal. When it is necessary to transmit, to the base station, a first signal reception result including data reception at a subsequent timing, the terminal transmitter 1310 may transmit the first signal reception result to the base station at a timing determined by the terminal processor 1320. For another example, the terminal receiver 1300 may receive DCI capable of validating activation or release of Type 2 CG-PUSCH from the base station. The terminal processor 1320 may determine whether the DCI activates or releases the Type 2 CG-PUSCH, based on a specific field value of the received DCI. When it is determined that the DCI releases the Type 2 CG-PUSCH, the terminal may stop transmitting the CG-PUSCH in the terminal transmitter 1310.

According to an embodiment of the disclosure, the terminal processor 1320 may include at least one processor. The at least one processor may execute programs stored in a memory to perform the above-described DCI receiving operation according to the embodiment of the disclosure.

Although not illustrated in FIG. 13, the terminal may further include a memory. According to an embodiment of the disclosure, the memory may store programs and data required for operations of the terminal. Also, the memory may store control information or data included in signals transmitted and received by the terminal. The memory may be implemented as a storage medium, such as ROM, RAM, hard disk, CD-ROM, and DVD, or a combination thereof. Also, the terminal may include a plurality of memories. According to an embodiment of the disclosure, the memory may store a program for performing the above-described DCI receiving operation according to the embodiment of the disclosure.

The methods according to the embodiments of the disclosure, which are described in the claims or the detailed description, may be implemented as hardware, software, or a combination of hardware and software.

When implemented as software, a computer-readable storage medium or a computer program product storing one or more programs (software modules) may be provided. One or more programs stored in the computer-readable storage medium or the computer program product are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in RAM, non-volatile memory including flash memory, ROM, electrically erasable programmable read only memory (EEPROM), magnetic disc storage device, CD-ROM, DVD, other types of optical storage devices, or magnetic cassette. Alternatively, one or more programs may be stored in a memory provided by a combination of all or part of these devices. Also, each memory may include a plurality of configured memories.

Also, one or more programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the disclosure. Also, a separate storage device on the communication network may access the device that performs the embodiment of the disclosure.

According to embodiments of the disclosure, a method and apparatus capable of effectively providing a service in a wireless communication system may be provided.

The term "computer program product" or "computer-readable medium" as used herein is used to collectively refer to a medium such as memory, hard disk installed in hard disk drive, and signals. The "computer program product" or "computer-readable medium" is used to provide the method of transmitting and receiving DCI, according to the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, first information configuring a frequency domain resource allocation (FDRA) type and second information on a subcarrier spacing for uplink transmission via radio resource control (RRC) signaling;
   receiving, from the base station, downlink control information, (DCI) including third information on FDRA; and
   releasing scheduling of an uplink configured grant in response to determining that all bits of the third information for FDRA type 2 are set to 0 and the second information is set to $\mu=1$.

2. The method of claim 1,
   wherein the DCI further includes hybrid automatic repeat request (HARQ) process number information, redundancy version information, and modulation and coding scheme information, and
   wherein the scheduling of the uplink configured grant is released in response to determining that all bits of the HARQ process number information are set to 0, all bits of the redundancy version information are set to 0 and all bits of the modulation and coding scheme information are set to 1.

3. The method of claim 1, wherein the scheduling of the uplink configured grant is released, in response to determining that all bits of the third information are set to 1 or the second information is not set to $\mu=1$.

4. The method of claim 1, further comprising:
   activating the scheduling of the uplink configured grant based on hybrid automatic repeat request (HARQ) process number information and redundancy version information included in the DCI.

5. The method of claim 4, wherein the scheduling of the uplink configured grant is activated in response to determining that all bits of the HARQ process number information are set to 0 and all bits of the redundancy version information are set to 0.

6. The method of claim 1, wherein a type of the uplink configured grant is type 2.

7. A method performed by a base station in a wireless communication system, the method comprising:
   transmitting, to a terminal, first information configuring a frequency domain resource allocation (FDRA) type and second information on a subcarrier spacing for uplink transmission via radio resource control (RRC) signaling; and
   transmitting, to the terminal, downlink control information (DCI) including third information on FDRA,
   wherein scheduling of an uplink configured grant is released, in response to determining that all bits of the third information for FDRA type 2 are set to 0 and the second information is set to $\mu=1$.

8. The method of claim 7, wherein a type of the uplink configured grant is type 2.

9. A terminal in a wireless communication system, the terminal comprising:
   a transceiver; and
   at least one processor configured to:
      receive, from a base station, first information configuring a frequency domain resource allocation (FDRA) type and second information on a subcarrier spacing for uplink transmission via radio resource control (RRC) signaling,
      receive, from the base station, downlink control information (DCI) including third information on FDRA, and
      release scheduling of an uplink configured grant in case that all bits of the third information for FDRA type 2 are set to 0 and the second information is set to $\mu=1$.

10. The terminal of claim 9, wherein a type of the uplink configured grant is type 2.

11. A base station in a wireless communication system, the base station comprising:
    a transceiver; and
    at least one processor configured to:
       transmit, to a terminal, first information configuring a frequency domain resource allocation (FDRA) type and second information on a subcarrier spacing for uplink transmission via radio resource control (RRC) signaling, and
       transmit, to the terminal, downlink control information, DCI, including third information on FDRA,
    wherein scheduling of an uplink configured grant is released, in case that all bits of the third information for FDRA type 2 are set to 0 and the second information is set to $\mu=1$.

12. The base station of claim 11, wherein a type of the uplink configured grant is type 2.

* * * * *